United States Patent
Ferree et al.

(10) Patent No.: US 6,904,985 B2
(45) Date of Patent: Jun. 14, 2005

(54) TRANSMISSION CONTROL DEVICE FOR VEHICLES AND STEERING ASSEMBLY FOR VEHICLES

(75) Inventors: Philip E. Ferree, Ankeny, IA (US); Bernard E. Romig, Illinois City, IL (US)

(73) Assignee: Deere & Company, Moline, IL (US)

(*) Notice: Subject to any disclaimer, the term of this patent is extended or adjusted under 35 U.S.C. 154(b) by 0 days.

(21) Appl. No.: 10/249,947

(22) Filed: May 21, 2003

(65) Prior Publication Data

US 2005/0023049 A1 Feb. 3, 2005

(51) Int. Cl.$^7$ ............................................... B60K 17/30
(52) U.S. Cl. ...................... 180/6.32; 180/6.34; 180/6.4; 280/211
(58) Field of Search .................. 180/6.3, 6.2, 6.48, 180/6.32, 6.34, 6.4; 280/211, 93.502, 93.51, 93.513, 98

(56) References Cited

U.S. PATENT DOCUMENTS

| | | | | |
|---|---|---|---|---|
| 3,362,493 A | * | 1/1968 | Davis et al. ............... | 180/6.32 |
| 4,202,276 A | | 5/1980 | Browne et al. | |
| 4,212,483 A | | 7/1980 | Howard | |
| 4,441,735 A | * | 4/1984 | Hutchison et al. .......... | 280/771 |
| 4,471,669 A | | 9/1984 | Seaberg | |
| 4,700,794 A | | 10/1987 | Bernhagen et al. | |
| 4,917,200 A | | 4/1990 | Lucius | |
| 5,042,238 A | * | 8/1991 | White et al. ................. | 56/11.8 |
| 6,053,542 A | | 4/2000 | Ostrowski | |
| 6,126,564 A | | 10/2000 | Irikura et al. | |
| 6,129,164 A | | 10/2000 | Teal et al. | |
| 6,131,689 A | * | 10/2000 | Nodorft et al. ............. | 180/409 |
| 6,196,342 B1 | | 3/2001 | Teal et al. | |
| 6,196,348 B1 | | 3/2001 | Yano et al. | |
| 6,257,357 B1 | | 7/2001 | Teal et al. | |
| 6,283,236 B1 | | 9/2001 | Teal et al. | |
| 6,325,396 B1 | * | 12/2001 | Romig ........................ | 280/98 |
| 6,336,513 B1 | | 1/2002 | Hasegawa et al. | |
| 6,354,388 B1 | * | 3/2002 | Teal et al. .................. | 180/6.2 |
| 6,397,966 B1 | | 6/2002 | Irkura et al. | |
| 6,454,032 B1 | | 9/2002 | Teal et al. | |
| 6,456,925 B1 | | 9/2002 | Romig | |
| 6,484,287 B1 | | 11/2002 | Hagele et al. | |
| 6,491,008 B1 | | 12/2002 | Zubeck | |
| 6,684,974 B1 | * | 2/2004 | Ulschmid ................... | 180/414 |
| 2001/0050188 A1 | | 12/2001 | Ima | |

FOREIGN PATENT DOCUMENTS

| | | |
|---|---|---|
| WO | WO 00/01569 | 1/2000 |
| WO | WO 00/19127 | 4/2000 |

* cited by examiner

*Primary Examiner*—Tony H. Winner
(74) *Attorney, Agent, or Firm*—Bell, Boyd & Lloyd, LLC

(57) ABSTRACT

A transmission control device which receives steering inputs and speed inputs, and produces an input for a steer transmission and an input for a drive transmission in order to control the direction and speed of a vehicle. The transmission control device, coupled to a steering assembly, coordinates the steering inputs with the speed inputs. The steering assembly which includes an elongated force transmitter operatively coupled to a steering device. The force transmitter, which is operatively coupled to a plurality of front wheels, has a fore-aft path of movement for pivoting the front wheels clockwise or counterclockwise. The present invention enhances the user's control and maneuverability of vehicles.

44 Claims, 24 Drawing Sheets

TRANSMISSION CONTROL DEVICE FOR VEHICLES AND STEERING ASSEMBLY FOR VEHICLES

CROSS REFERENCE TO RELATED APPLICATIONS

This application is related to the following commonly owned co-pending patent application: U.S. application patent Ser. No. 10/230,724 filed on Aug. 29, 2002, entitled "Device Providing Variable Steering Responsiveness."

BACKGROUND OF THE INVENTION

The present invention generally relates to a transmission control device for vehicles and to a steering assembly for vehicles. More specifically, the present invention relates to a transmission control device for coordinating steering inputs with speed inputs and to a steering assembly providing increased reliability and space efficiency.

When the driver of a typical vehicle makes a turn, the vehicle responds by changing its direction. In certain vehicles, such as the conventional tractor, the steering wheel is coupled to a steering linkage which, in turn, is coupled to the front wheels. When the driver turns the steering wheel, the front wheels pivot clockwise or counterclockwise. In one type of tractor, commonly known as a zero turn radius tractor, the rear drive wheels rotate independent of one another. The driver controls both the speed and direction of this tractor by controlling the motion of the rear drive wheels relative to one another. In this case, the steering linkage is coupled to the rear drive wheels. When the driver turns the steering wheel, this causes the rear drive wheels to rotate at different rates, which causes the tractor to turn.

It has been found that, in this type of tractor, when the driver is in the process of making a turn, the radius of the turn can change even though the driver holds the steering wheel in one position. This can occur when the driver increases or decreases the ground speed while making the turn. For example, if the driver turns the steering wheel to follow along a curved driveway, and at the same time, the driver presses the foot pedal, increasing the ground speed, the tractor can slightly wander away from the curved driveway. This is because the transmission of this tractor, which controls the ratio of right rear wheel speed to the left rear wheel speed, produces a change in this ratio when the driver changes the ground speed in the midst of a turn.

In addition to this wandering disadvantage, this type of tractor also has the disadvantage of castor front wheels which do not function like the conventional automobile-type front wheels. The castor wheels, which are not linked to the steering wheel, are free to swivel in any direction. This freedom is necessary to prevent front wheel slippage when the tractor wanders as described above.

Not only are castor front wheels less familiar to automobile drivers, they tend to cause the front end of the tractor to wander when the tractor is traveling laterally along a slope or hillside. For these reasons, drivers must spend time to acquire the skill necessary for steering and operating this tractor in various driving conditions.

However, if the transmission of a zero turn radius tractor could be adapted to prevent the wandering problem described above, the tractor could use conventional automobile-type front wheels. If a conventional automobile-type steering linkage, commonly known as an Ackerman-type steering linkage, were to be used in a zero turn radius tractor, such a steering linkage would present several disadvantages. This steering linkage includes a rack and pinion gear assembly and steering arms, both of which are positioned behind the front axle of the vehicle. This type of linkage consumes valuable space which could be occupied by other parts of the vehicle. In addition, the rack and pinion gear assembly is relatively complex which leads to several disadvantages. The gear assembly can malfunction relatively frequently, require a relatively high amount of maintenance service and is relatively expensive to manufacture.

The zero turn radius tractor described above also requires a reverse travel mechanism in order for the tractor to properly respond to the driver's steering inputs while traveling in reverse. This mechanism is necessary, in part, because the steering wheel and the foot pedals are separately and independently coupled to the rear drive wheels. The reverse travel mechanism is relatively complex, including a relatively high number of mechanical and electrical parts. Therefore, the reverse travel mechanism results in a relatively significant manufacturing expense and can require maintenance, service and replacement from time to time.

Therefore, there is a need to overcome each of the disadvantages described above.

SUMMARY OF THE INVENTION

The present invention relates to a transmission control device for vehicles and to a steering assembly for vehicles. More specifically, the present invention relates to a transmission control device for coordinating steering inputs with speed inputs and to a steering assembly having steerable front wheels configured for providing increased reliability and space efficiency. In one embodiment, the transmission control device is adapted for use in a zero radius turn tractor having zero radius turn capability, wherein the turn determined by the steerable front wheels is synchronized with the turn determined by the rear drive wheels. Here, the transmission includes a drive portion, a steer portion and the transmission control device. The rear drive wheels control the direction of the tractor. In one embodiment, the tractor includes a steering wheel which is operatively coupled to the transmission of the tractor. The transmission is operatively coupled to the rear drive wheels. When the user turns the steering wheel to the right or to the left, the transmission changes the speed of the drive wheels relative to one another. This changes the direction of the tractor. When the user presses down on a forward foot pedal or a reverse foot pedal, the transmission causes the rear drive wheels to move forward or backward, thereby causing the tractor to propel forward or backward.

When the user is in the process of driving the tractor at a particular speed while making a turn at the same time, the transmission receives both a steering input and a foot pedal input. The transmission control device receives these inputs, coordinates the steering inputs with the foot pedal inputs and sends an appropriate command to the drive portion of the transmission and also sends an appropriate command to the steer portion of the transmission. The transmission control device blends together the steering inputs and the foot pedal inputs in such a manner that when the user is in the midst of a turn, any increase or decrease in the ground speed results in no substantial change, if any, to the radius of the turn. In addition, the transmission control device controls the inputs to the transmission so that, whether the tractor is traveling forward or in reverse, the tractor changes direction in response to the turn of the steering wheel in the same fashion as an automobile would change direction.

In one embodiment, the transmission control assembly includes an apparatus for providing inputs or commands to a drive transmission and a steer transmission of a vehicle. The apparatus includes: (a) a drive input receiver; (b) a steer input receiver; (c) a drive transmission input device; (d) a steer transmission input device; and (e) a converter operatively coupled to the drive input receiver, the steer input receiver, the drive transmission input device and the steer transmission input device.

In one embodiment, the drive input receiver includes a pivoting member, the steer input receiver includes a crank member, and the drive transmission input device and the steer transmission input device each include a pivoting member. The converter includes a drive multiplier and a steer multiplier which are preferably identical to each other.

In one embodiment, the present invention includes a method for controlling command input to the transmission of the vehicle. The method includes the steps of: (a) receiving a steering input from the user's steering control device; (b) receiving a speed input from the user's speed control device; (c) blending the steering input with the speed input to generate a steer transmission command; (d) blending the speed input with the steering input to generate a drive transmission command; (e) transmitting the generated steering transmission command to the transmission; and (f) transmitting the generated drive transmission command to the transmission.

The steering assembly or steering system in one embodiment of the present invention includes a steering wheel which is operatively coupled to a push rod. The push rod, which is operatively coupled to the front wheels of the tractor, moves in a fore-aft direction to pivot the front wheels in a clockwise or counterclockwise direction. This steering assembly can be used in conjunction with the transmission control device described above, in order to synchronize or coordinate the turn angle of the front wheels with the turn angle determined by the ratio of the right rear wheel speed to the left rear wheel speed. This steering assembly can also be used in conjunction with any suitable vehicle.

In one embodiment, the steering assembly includes: (a) an axle having a first axle end and a second axle end; (b) a first wheel mount arm operatively coupled to the first axle end; (c) a second wheel mount arm operatively coupled to the second axle end; (d) a first crank arm operatively coupled to the axle near the first axle end and operatively coupled to the first wheel mount arm; (e) a second crank arm operatively coupled to the axle near the second axle end and operatively coupled to the second wheel mount arm; and (f) an input member operatively coupled to the first crank arm. The input member has a fore-aft path of movement. Here, the input member is preferably a push rod. It is also preferable that the steering assembly includes a transverse link which is constrained to move laterally relative to the axle and which operatively couples the first crank arm to the second crank arm. It is preferable that each end of this transverse link is coupled to a relatively short tie rod, and each tie rod is connected to one of the crank arms. It should be appreciated that the proportion of the length of such tie rods to the other links in the steering assembly determines, in part, a suitable turn response per user input.

In another embodiment, the steering assembly includes: (a) a steering device; (b) a preferably round crank operatively coupled to the steering device; (c) a flexible force transmitter coupled to the crank and adapted to be operatively coupled to the transmission; and (d) a fore-aft movable coupling member operatively coupled to the crank. The coupling member is preferably adapted to be operatively coupled to the front wheels.

The transmission control device of the present invention receives steering inputs and foot pedal inputs. The transmission control device includes a converter which coordinates these inputs and produces a command input for the drive portion of a vehicle's transmission and a separate command input for the steer portion of a vehicle's transmission. The transmission control device translates the user's steering inputs and foot pedal inputs into command inputs which cause the transmission to properly propel and steer the vehicle. The transmission control device provides vehicles with increased steering control and maneuverability.

The steering assembly in one embodiment of the present invention includes a single push rod which couples the steering wheel to the front wheels. In this embodiment, the front end of the steering assembly does not include any gears, but rather includes a plurality of pivoting members and one transversely movable member. This type of steering assembly provides vehicles with the capability to have the front wheels follow a zero radius (pivot) turn while increasing steering reliability and space efficiency.

In one embodiment, the present invention includes a vehicle equipped with the transmission control device and the steering assembly described above. In this vehicle, the rear drive wheels and the front wheels simultaneously change the direction of the vehicle at the same radius of turn. This provides the vehicle with increased stability, traction and maneuverability. The turn radius determined by the rear drive wheels is equal to or substantially equal to the turn radius determined by the front wheels, regardless of the user's increases or decreases in ground speed. The user can control the orientation of the front wheels, providing increased control when driving laterally along slopes. Furthermore, the vehicle changes direction in response to the user's steering changes in the same fashion as an automobile, regardless of whether the vehicle is traveling forward or in reverse.

It is therefore an advantage of the present invention to provide a transmission control device for vehicles.

Another advantage of the present invention is to reduce or eliminate wandering of vehicles.

Yet another advantage of the present invention is to increase the stability, traction and steering control of vehicles.

Still another advantage of the present invention is to cause vehicles to be more maneuverable by users.

Another advantage of the present invention is to reduce or eliminate a change in the turn radius of a vehicle caused by a change in speed input when the steering device is held at a substantially constant turn angle.

Yet another advantage of the present invention is to coordinate steering inputs with speed control inputs and to produce: (a) command inputs for the drive portion of a vehicle's transmission and (b) command inputs for the steer portion of a vehicle's transmission.

Still another advantage of the present invention is to provide a mechanical linkage for vehicles with dual-type transmissions which causes the vehicles to change directions in the same fashion as an automobile, whether the vehicles are traveling forward or in reverse.

Another advantage of the present invention is to provide a steering assembly for vehicles.

Still another advantage of the present invention is to increase the reliability of a steering system for a vehicle.

Yet another advantage of the present invention is to increase the space efficiency of a steering system for a vehicle.

Another advantage of the present invention is to provide a steering assembly which simultaneously transmits a users steering inputs to the transmission of a vehicle and to the front wheels of the vehicle.

Yet another advantage of the present invention is to simplify a steering assembly for a vehicle by mounting the linkage in front of the front vehicle axle (or behind the rear vehicle for a rear steer vehicle) and eliminating a rack and pinion actuation in favor of a push pull link.

Additional features and advantages of the present invention are described in, and will be apparent from, the following Detailed Description of the Invention and the figures.

DETAILED DESCRIPTION OF THE INVENTION

Figure 1:
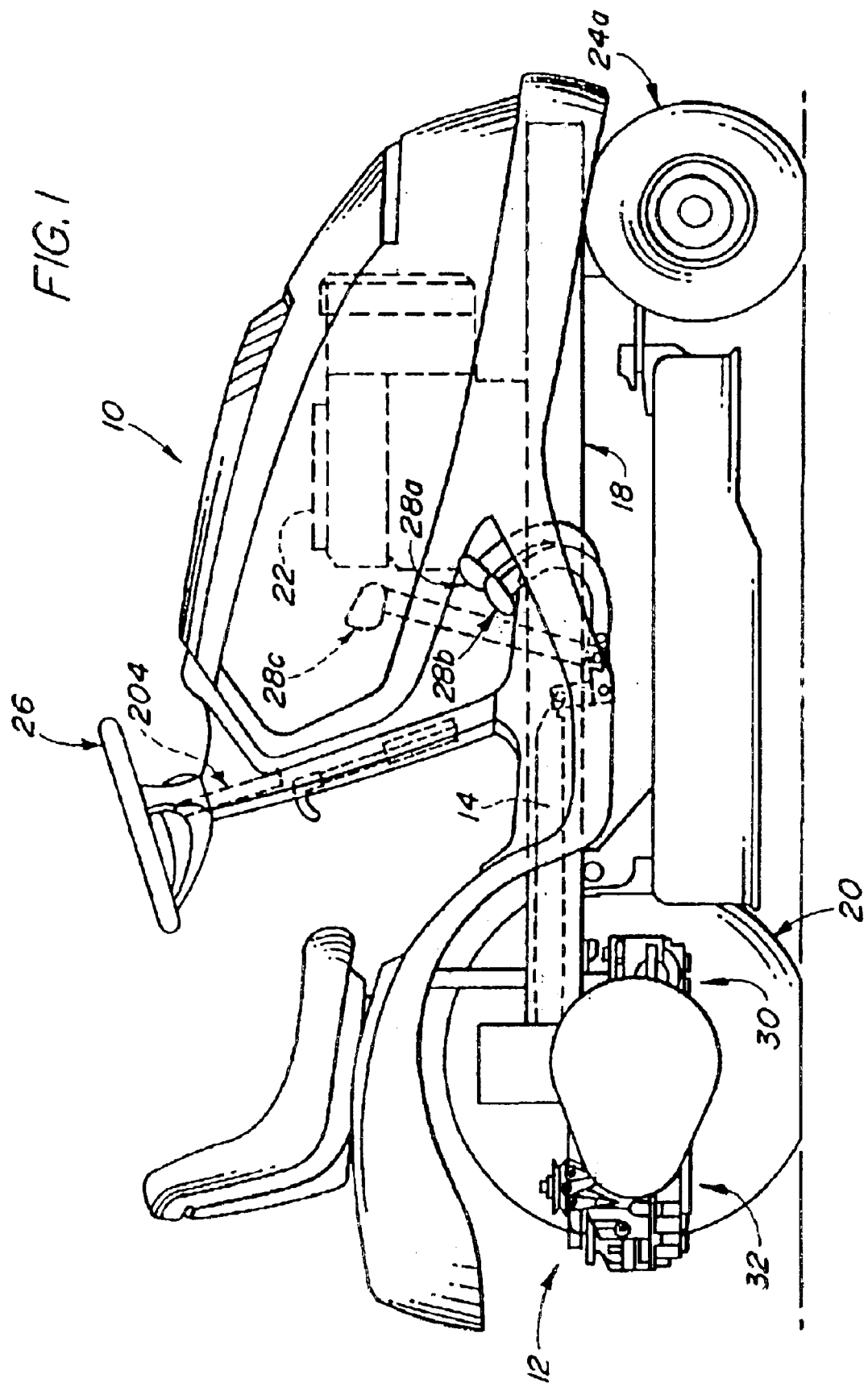
FIG. 1 is an elevated side perspective view of a tractor having the transmission control device and the steering assembly in one embodiment of the present invention.
Figure 2:
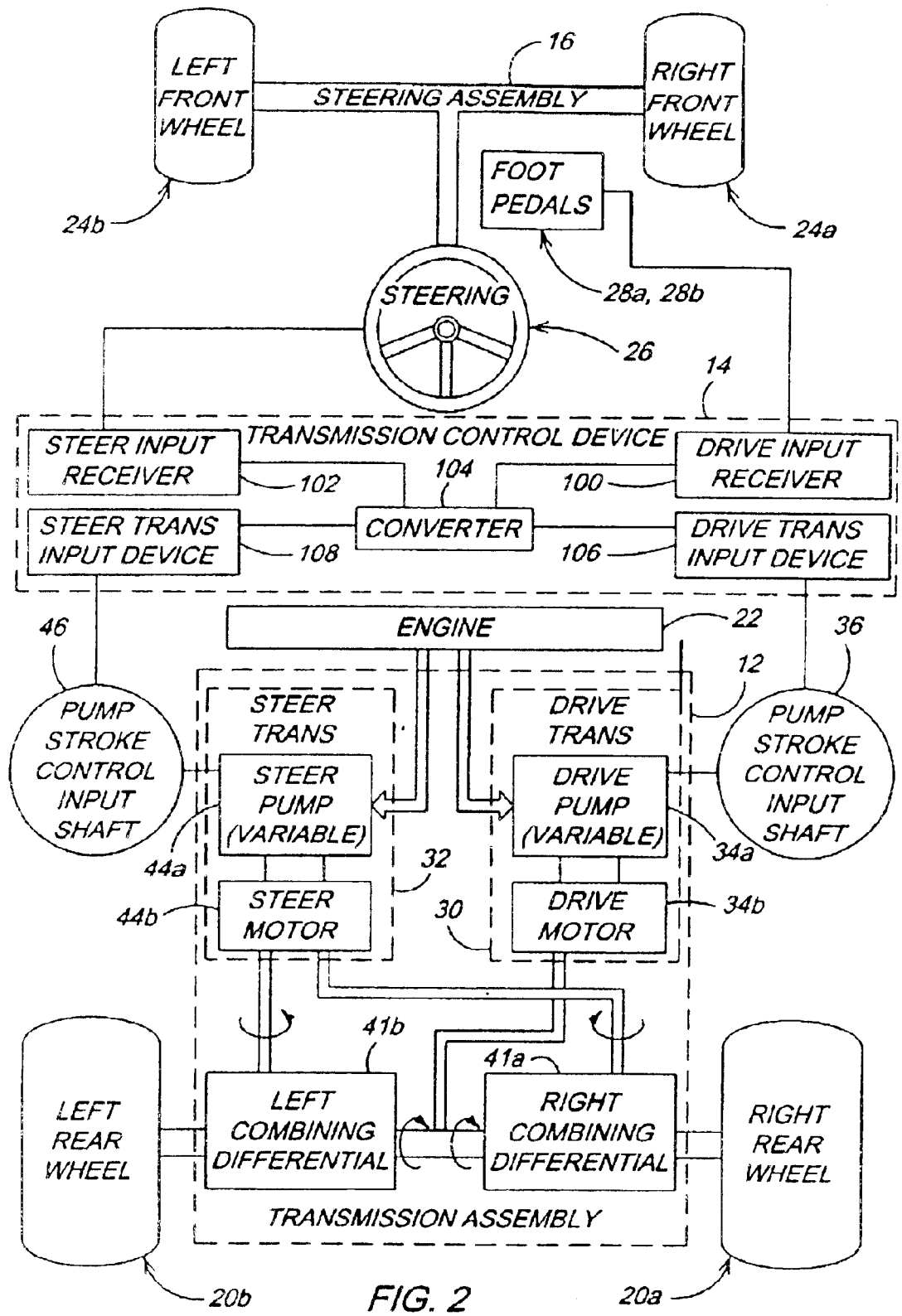
FIG. 2 is a schematic of a tractor having the transmission control device and the steering assembly in one embodiment of the present invention.
Figure 3:
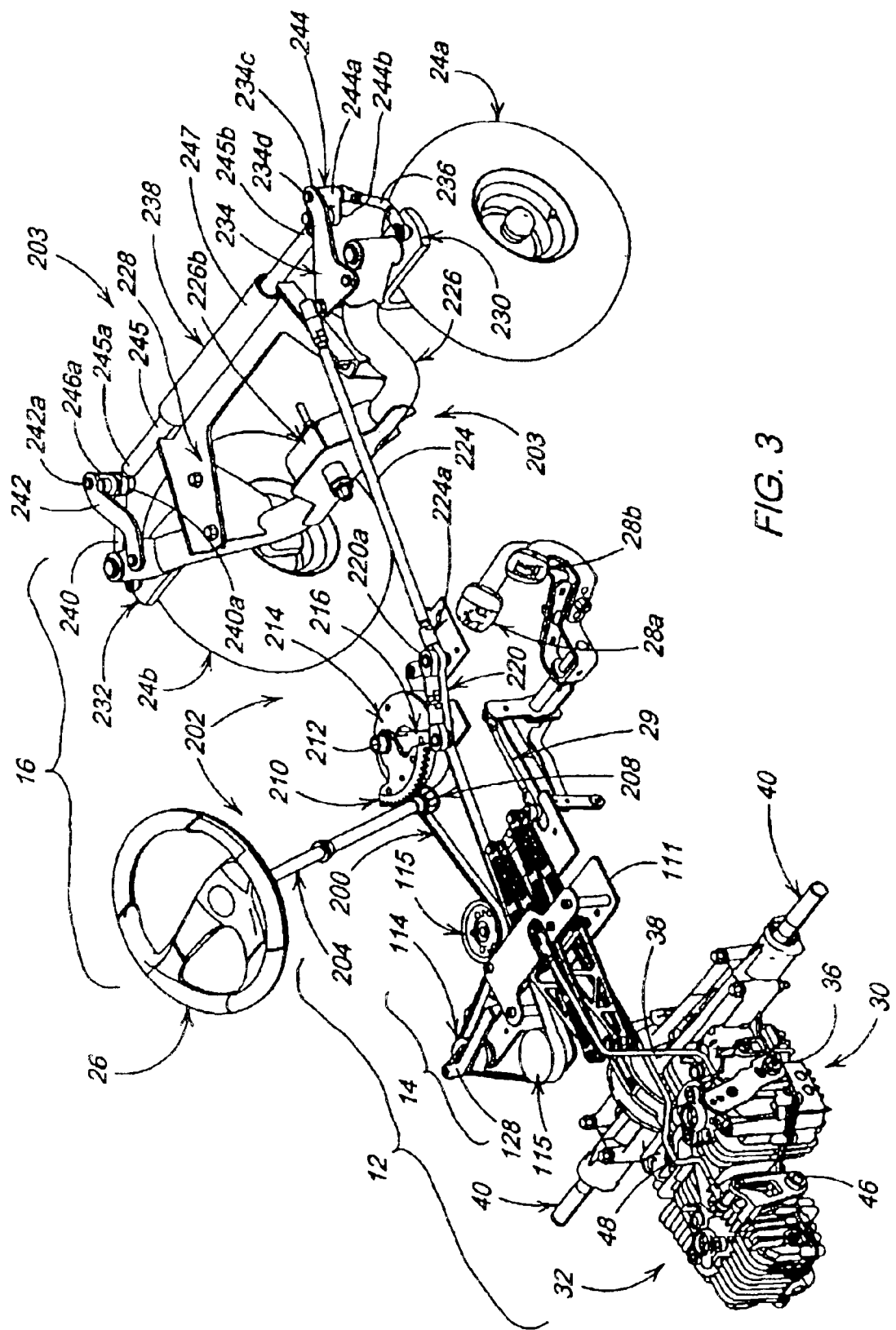
FIG. 3 is a top perspective view of the transmission assembly and the steering assembly of a tractor in one embodiment of the present invention.

Referring now to the drawings, FIGS. 1 through 23 illustrate a vehicle, such as tractor 10, which includes a transmission assembly 12 having the transmission control device 14 in one embodiment of the present invention and which also includes a steering assembly 16 in one embodiment of the present invention. The tractor 10, in one embodiment, includes: (a) a tractor frame 18; (b) a plurality of rear drive wheels 20a and 20b rotatably connected to the vehicle frame or tractor frame 18; (c) an engine 22 operatively coupled by the transmission assembly 12 to the drive wheels 20a and 20b; (d) a plurality of front wheels 24a and 24b rotatably connected to the tractor frame 18; (e) a steering wheel or another suitable user controlled steering device 26 for controlling the direction of the tractor 10; (f) a steering assembly 16 which couples the steering device 26 to the transmission assembly 12 and to the front wheels 24a and 24b; and (g) one or more speed control devices, preferably foot pedals 28a to 28c, operatively coupled to the transmission assembly 12 for controlling the ground speed of the tractor 10.

I. User Controls

The steering device 26, which preferably includes a rotatable handle or steering wheel, is operatively coupled to the steering assembly 16. As described in detail below, the steering assembly 16 includes a timed steering belt 200, driven by sprocket 214 of the steering input linkage 202, which drives the steer crank assembly 114 of the transmission control mechanism or device 14. The transmission control device 14 couples the steering device 26 to the drive wheels 20a and 20b as described below. When the user turns the steering device 26, the user causes the right and left drive wheels 20a and 20b to rotate at different speeds relative to each other. This difference in rotational movement causes the tractor 10 to change its direction to the right or to the left relative to a straight forward line of travel.

The foot pedals 28a to 28c include a forward foot pedal 28a for propelling the tractor 10 forward, a reverse foot pedal 28b for propelling the tractor 10 in a reverse direction and a brake pedal 28c for stopping tractor 10. The foot pedals 28a and 28b are coupled to a foot pedal linkage 29 which, in turn, is coupled to the common rocker 110 of the transmission control device 14. The transmission control device 14 couples the foot pedal linkage 29 to the drive wheels 20a and 20b as described below. The brake pedal 28c is coupled to the brake assembly (not shown) of the tractor 10.

II. Transmission Assembly in General

The transmission assembly 12 of tractor 10 serves a dual function of transmitting rotational power from the engine 22 to the drive wheels 20a and 20b for propelling the vehicle 10 across the ground, and for altering the rotational speeds of the right and left drive wheels 20a and 20b. This causes the drive wheels 20a and 20b to rotate at different speeds which causes the tractor 10 to turn. The transmission assembly 12 preferably has two transmissions, one for the speed, propel or drive purpose and another for the differential or steer purpose.

In one embodiment, the transmission assembly 12 is a dual differential type transmission which includes: (a) a suitable drive transmission 30 for transmitting power from the engine 22 to the right and left combining differentials 41a and 41b thence to the drive wheels 20a and 20b, causing the drive wheels 20a and 20b to increase or decrease in speed in response to the input commands received from the transmission control device 17; (b) a suitable steer transmission 32 for transmitting power from the engine 22 to the combining right and left differentials 41a and 41b thence to the drive wheels 20a and 20b, causing drive wheel 20a to increase or decrease its speed while drive wheel 20b simultaneously decreases or increases its speed by the same amount, in response to the commands received from the transmission control device; and (c) the transmission control device 14 which controls and coordinates the commands going to the drive transmission 30 and the steer transmission 32.

A. Drive Transmission

The drive transmission 30 preferably includes: (a) a drive pulley (not shown) which transmits power from the engine 22 to a hydrostatic pump unit 34a; (b) a pump stroke control input shaft 36 which controls the displacement of the pump swash plate (not shown) in the hydrostatic pump unit 34a; (c) a coupling member or drive linkage 38; and (d) a motor unit 34b coupled to the input shaft 36 and to the transmission control device 14.

The motor unit 34b includes an output shaft (not shown) which drives the first input of both the right combining differential 41a and the left combining differential 41b in the same direction.

By manipulating the forward and reverse pedals 28a and 28b and the steering device 26, the user causes the input shaft 36 to pivot. The pivot action of the input shaft 36 controls the displacement of the pump through a swash plate (not shown) in the pump unit 34a, thereby increasing or decreasing the ratio of the rate of rotation of the output of motor 34b to the rate of rotation of the engine 22. Depressing the forward pedal 28a, with the steering device 26 in a central or neutral position, causes the input shaft 36 to pivot in a direction which causes the drive transmission 30 to propel the tractor 10 forward, and depressing the reverse pedal 28b, with the steering device 26 in a central or neutral position, causes the input shaft 36 to pivot in an opposite direction which causes the drive transmission 30 to propel the tractor 10 in a reverse direction.

B. Steer Transmission

The steer transmission 32 using a preferably includes: (a) a drive pulley (not shown) which transmits power from the engine 22 to a hydrostatic pump unit 44a; (b) a pump stroke control input shaft 46 which controls the displacement of the pump using a swash plate (not shown) in the pump unit 44a; (c) a coupling member or steer linkage 48; and (d) a motor unit 44b coupled to the input shaft 46 and to the transmission control device 14.

The motor unit 44b includes an output shaft (not shown) which drives the second input of both the right combining differential 41a and the left combining differential 41b in opposite directions. The combining differential mechanisms 41a and 41b serve the role of directly transmitting the sum of their two input motions to the rear wheels 20a and 20b. When the output of the steer motor 44b is non zero, in response to steering inputs from the user, the motion transmitted can increase or decrease the rotational speed of either rear axle 40 in either direction, depending upon the user's steering inputs. In one embodiment, the differential mechanisms 41a and 41b each include a rotatable ring gear, a planet carrier, planet gears and a sun gear, none of which are shown in the figures.

By manipulating the steering device 26 and the forward reverse pedals 28, the user causes the input shaft 46 to pivot. The pivot action of the input shaft 46 controls the displacement of the pump swash plate in the pump unit 44a, thereby increasing or decreasing the ratio of the rate of rotation of the output of motor 44b to the rate of rotation of the engine 22. Rotation of the output shaft of motor 44b causes the ring gears of the two combining differentials 41a and 41b to rotate at the same speed but in opposite directions. A clockwise turn of a steering device 26, while the tractor 10 is traveling forward, for example, causes the input shaft 46 to pivot in one direction. This causes the steer transmission 32 to increase the speed of the left rear drive wheel 20b relative to the right rear drive wheel 20a, thereby turning the tractor 10 in a clockwise direction. A counterclockwise turn of a steering device 26, while the tractor 10 is traveling forward for example, causes the input shaft 46 to pivot in an opposite direction. This causes the steer transmission 32 to increase the speed of the right rear drive wheel 20a relative to the left rear drive wheel 20b, thereby turning the tractor 10 in a counterclockwise direction.

It should be appreciated that the transmission assembly 12 of the present invention can include any suitable drive transmission and steer transmission, including, without limitation, chain-type and sprocket-type transmissions.

II. Transmission Control Device of Transmission Assembly

The transmission control device 14 of the present invention receives steering inputs and ground speed or foot pedal inputs from the user and then produces outputs based on these inputs. The outputs function as inputs to the transmission assembly 12 for controlling the speed and direction of the tractor 10. In one embodiment illustrated in FIG. 2, the transmission control device 14 includes: (a) a drive input receiving device or drive input receiver 100; (b) a steer input receiving device or steer input receiver 102; (c) a blending device, force conversion device, motion converter or force converter, generally referred to herein as a converter 104; (d) a drive transmission input device or drive transmission command device 106; and (e) a steer transmission input device or steer transmission command device 108. In operation, the drive input receiver 100 receives inputs from the foot pedals 28a and 28b, and the steer input receiver 102 receives inputs from the steering device 26. The converter 104 receives these inputs and converts these inputs into a plurality of converter outputs. The converter 104 transmits one converter output to the drive transmission input device 106, and the converter 104 transmits another converter output to the steer transmission input device 108. The drive transmission input device 106 and the steer transmission input device 108 each provide an input to the drive transmission 30 and the steer transmission 32, respectively.

A. General Components

The transmission control device 14 of the present invention receives steering inputs and ground speed or foot pedal inputs from the user and then produces outputs based on these inputs. The outputs function as inputs to the transmission assembly 12 for controlling the speed and direction of the tractor 10. In one embodiment illustrated in FIG. 2, the transmission control device 14 includes: (a) a drive input receiving device or drive input receiver 100; (b) a steer input receiving device or steer input receiver 102; (c) a blending device, force conversion device, motion converter or force converter, generally referred to herein as a converter 104; (d) a drive transmission input device or drive transmission command device 106; and (e) a steer transmission input device or steer transmission command device 108. In operation, the drive input receiver 100 receives inputs from the foot pedals 28a and 28b, and the steer input receiver 102 receives inputs from the steering device 26. The converter 104 receives these inputs and converts these inputs into a plurality of converter outputs. The converter 104 transmits one converter output to the drive transmission input device 106, and the converter 104 transmits another converter output to the steer transmission input device 46. The drive transmission input device 36 and the steer transmission input device 108 each provide an input to the drive transmission 30 and the steer transmission 32, respectively.

B. Logic

The logic or mathematical description of the transmission control device of the present invention can include a suitable set of mathematical equations, formulas, variables and definitions. In one approach, the speed/steering relation for tractor 10 can be defined or described by a series of equations. The outputs are the drive wheel speeds, as multiples of the reference speed. The speed multiplier values for the drive wheels are functions of the steer angle. The steer angle can be defined as the angle through which a center front wheel (such as that of a tricycle) would have to be steered in order to perform the desired maneuver, as indicated by angle $\hat{1}_s$ in FIG. 7.

The following definitions can be used in the following equations:

Steerangle: For the Steerangle, 0 is straight ahead, and positive is counterclockwise when looking down at the tractor 10 from a top view.

Rear tread: Rear tread is measured from the centerline of a rear wheel tire to the centerline of another rear wheel tire.

W=Wheelbase: Wheelbase is measured horizontally from the center line of the rear axle to the centerline of the front axle.

S=Wheel speed multiplier, a ratio to the reference speed, which is the magnitude of the velocity of the center of the front axle 226 of the tractor 10. A numerical value of one indicates that the speed of the wheel equals the reference speed. The subscript can take on the values of:

T=Tire distance: distance between the center of each rear tire.

rr=Right Rear and lr=Left Rear

Figure 7:
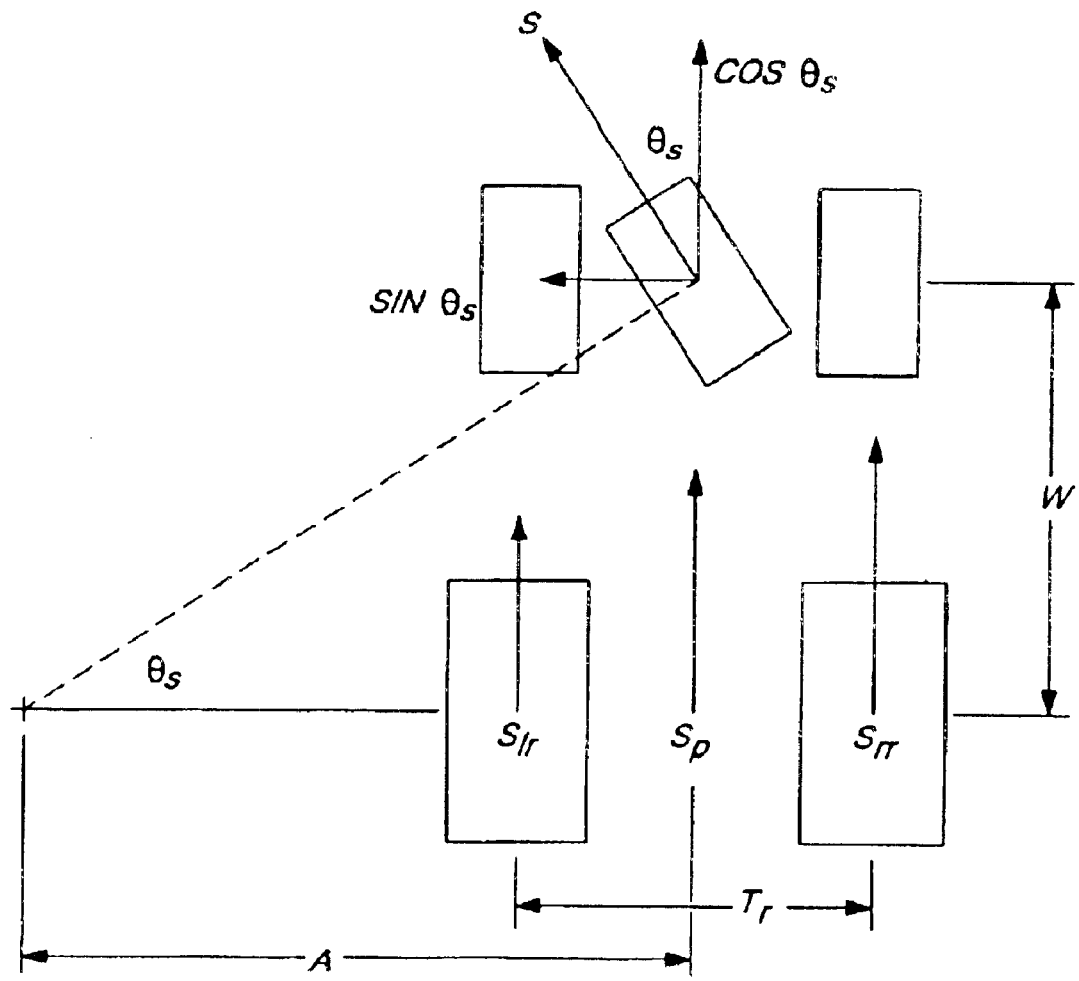
FIG. 7 is a schematic of the geometry of a turning vehicle on which the logic for the transmission control device is based in one embodiment of the present invention.
Figure 8:
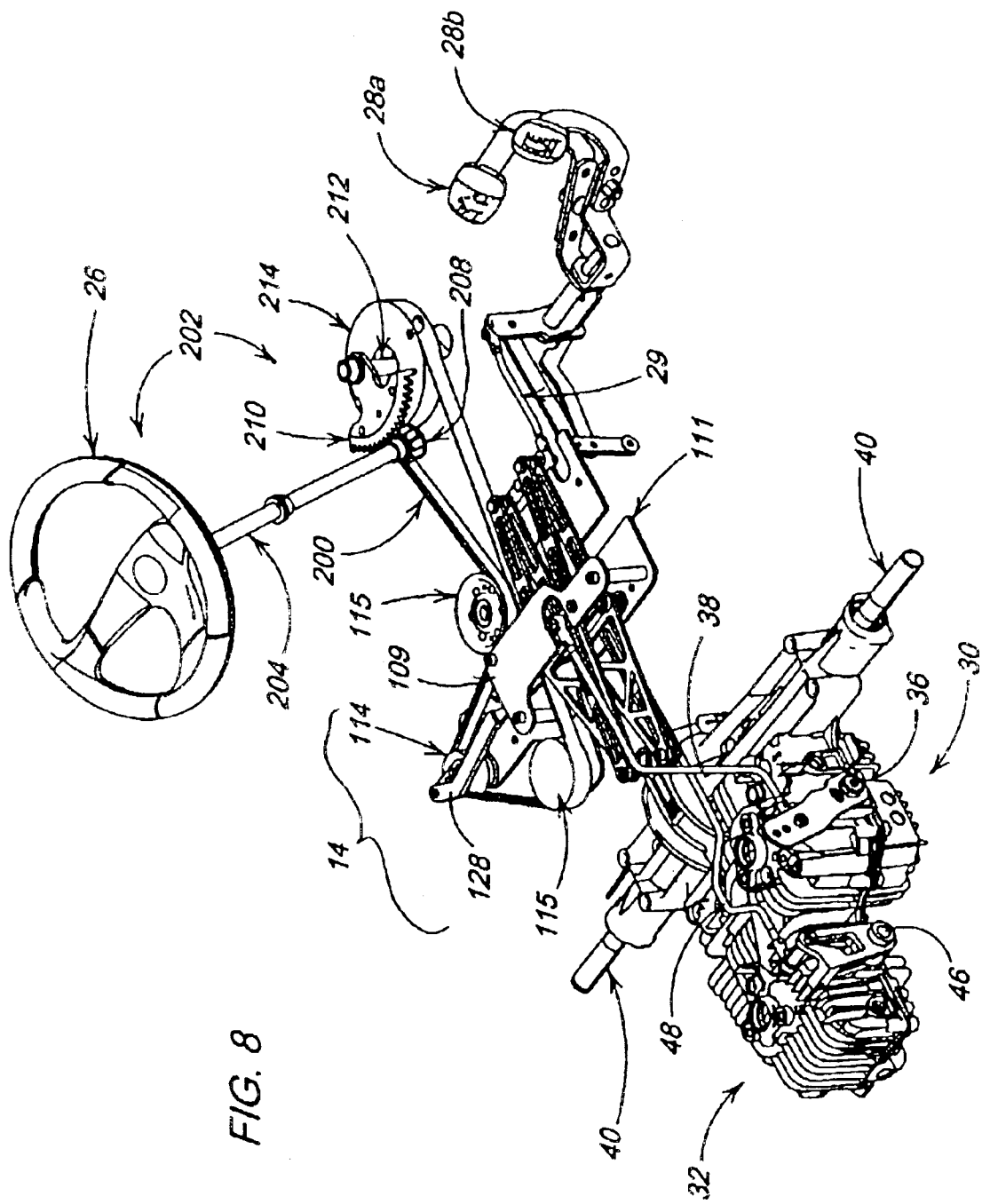
FIG. 8 is a rear top perspective view of a portion of the steering assembly, the drive transmission, the steer transmission and the transmission control device in one embodiment of the present invention.
Figure 9:
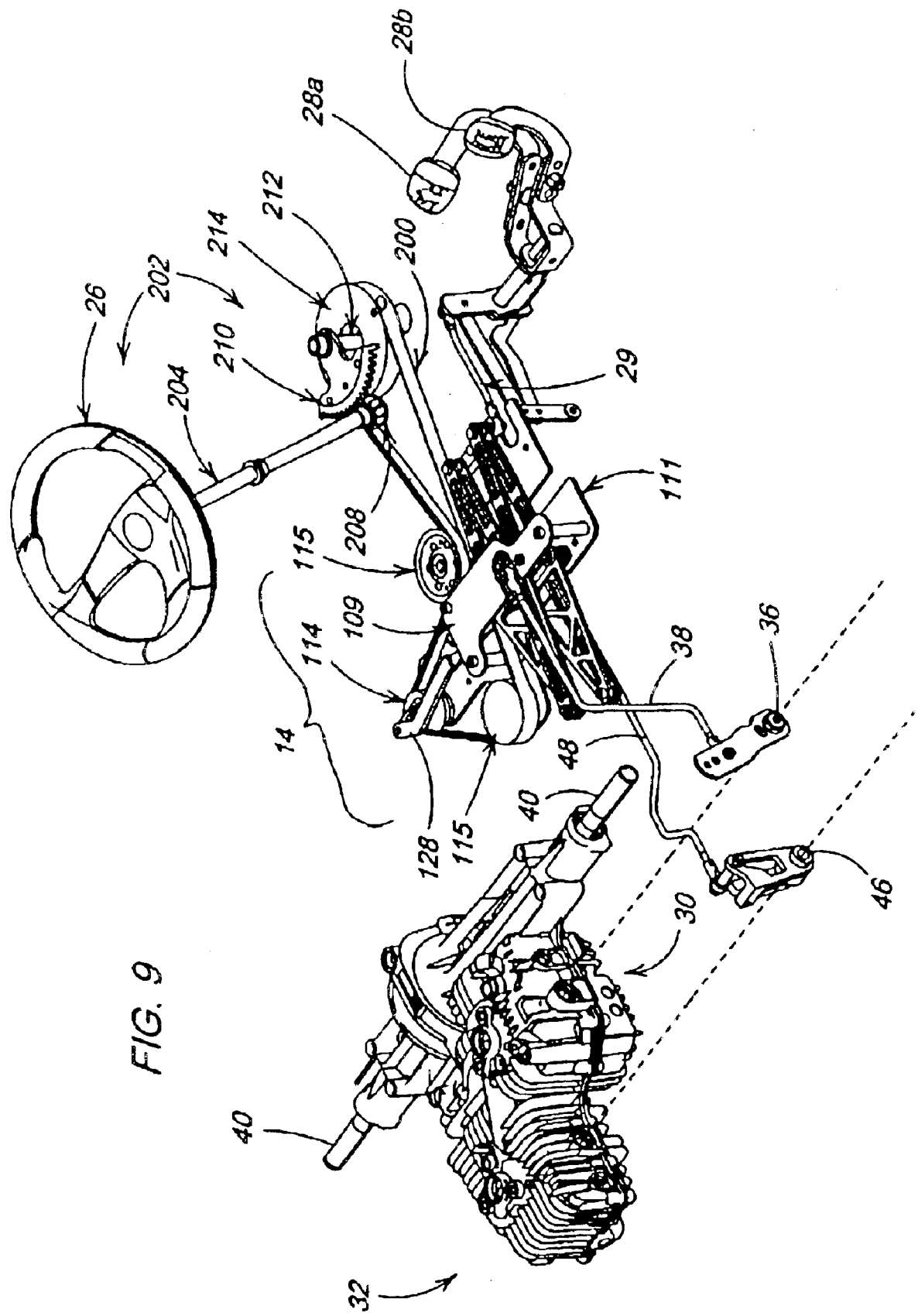
FIG. 9 is an exploded rear top perspective view of a portion of the steering assembly, the drive transmission and the steer transmission separated from the transmission control device in one embodiment of the present invention.
Figure 10:
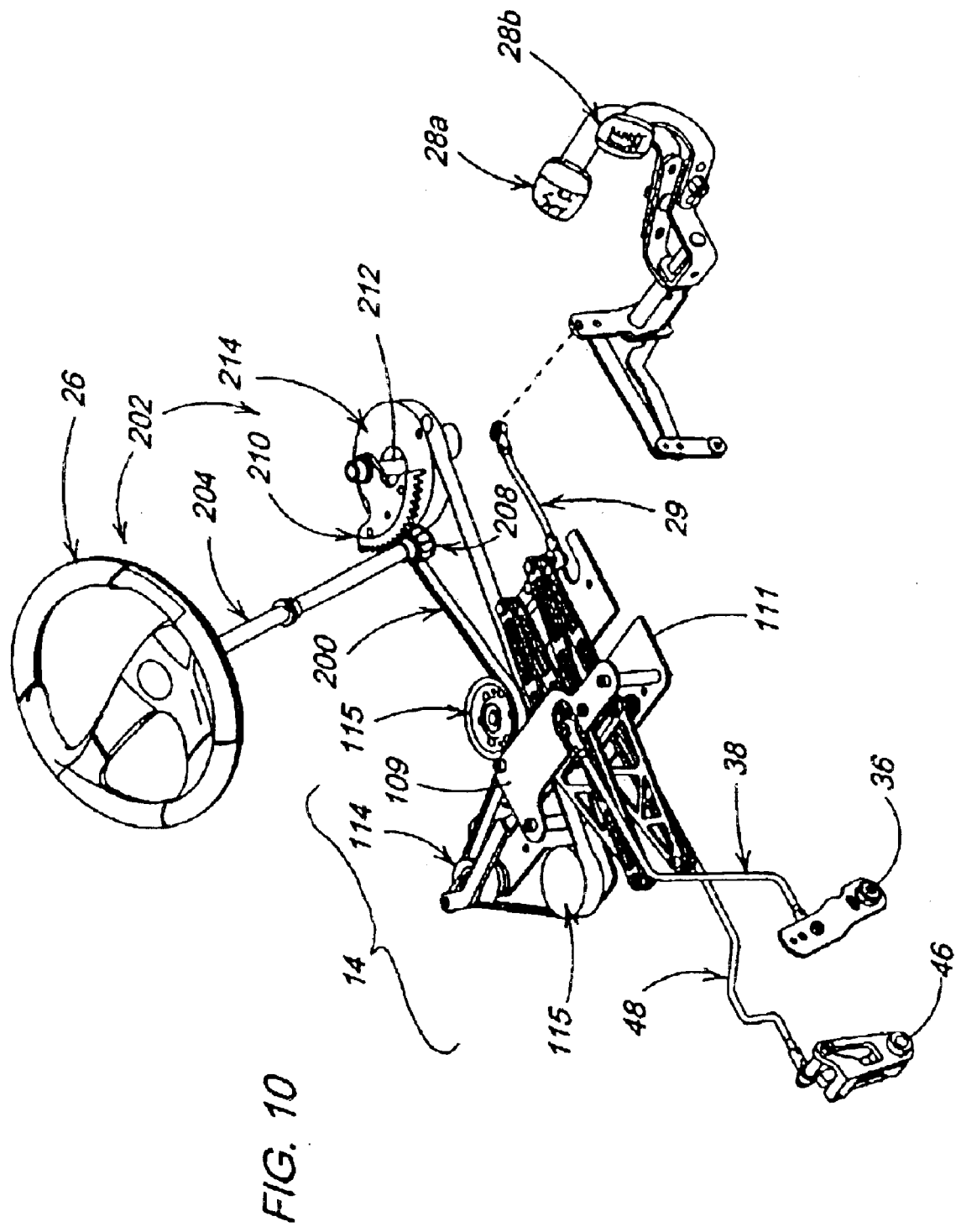
FIG. 10 is an exploded rear top perspective view of a portion of the steering assembly, the transmission control device and the foot pedals separated from the transmission control device.
Figure 11:
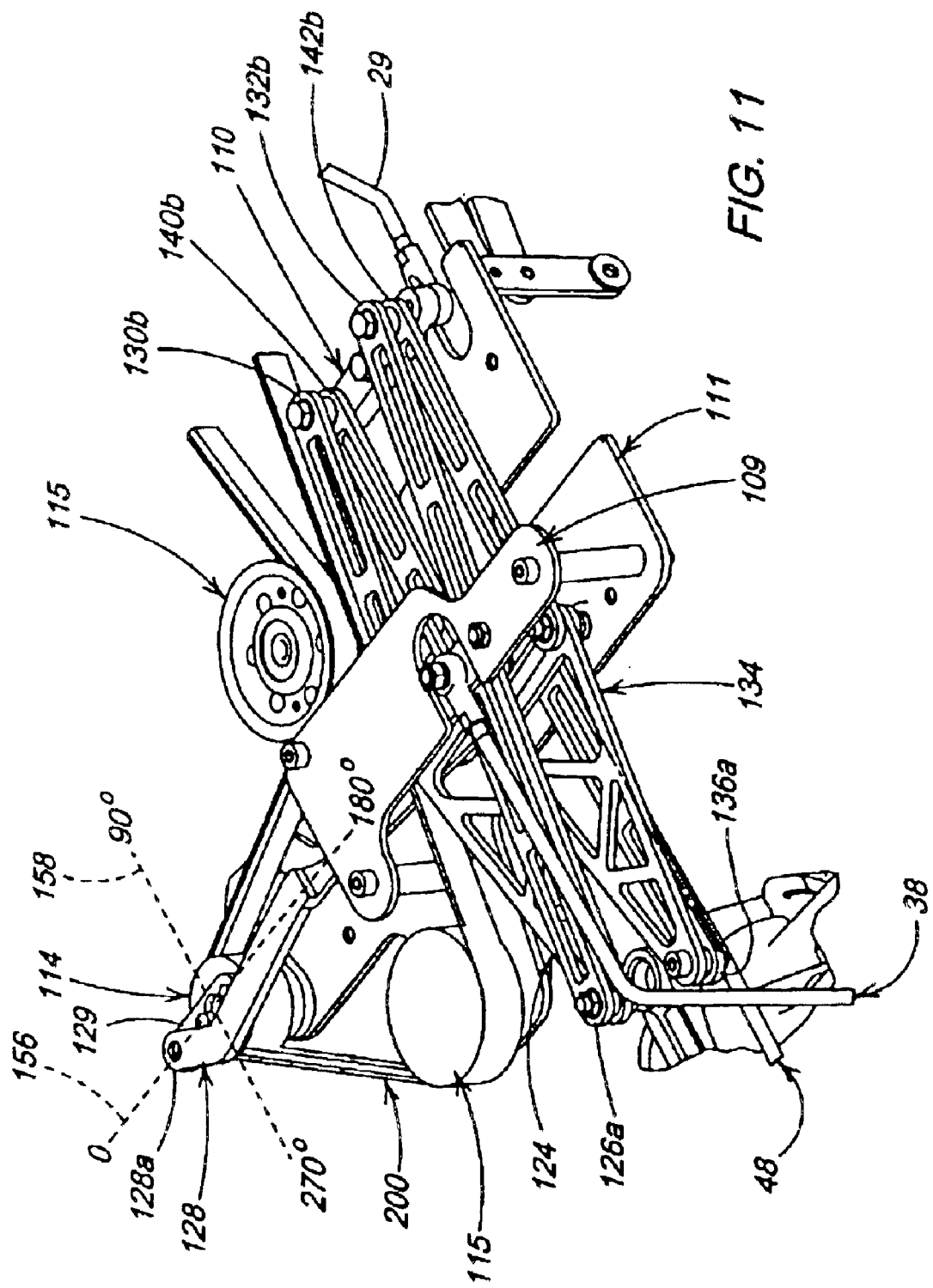
FIG. 11 is a rear top perspective view of the transmission control device in a neutral position in one embodiment of the present invention.

As illustrated in FIG. 7, knowing that the angular rate of rotation about the $$\frac{\cos\theta_s}{A} = \frac{S_{lr}}{A - \frac{T_r}{2}} \quad \text{(b)}$$

$$\frac{\cos\theta_s}{\frac{W}{\tan\theta_s}} = \frac{S_{lr}}{\frac{W}{\tan\theta_s} - \frac{T_r}{2}} \quad \text{(c)}$$

$$S_{lr} = \left(\frac{\cos\theta_s \ \tan\theta_s}{W}\right)\left(\frac{W}{\tan}\right) \quad \text{(d)}$$

Equations (d) and (e) set forth above are the governing relations for two independent transmissions, each driving one rear wheel. The following steps extend this logic to the double differential configuration:

To achieve these speeds with a transmission assembly 12, the output speed ratio of the drive transmission must satisfy:

$$S_D = \frac{S_{rr} + S_{lr}}{2} = \cos\theta_\pi$$

and the speed ratio for the steer transmission output must satisfy:

$$S_S = \frac{S_{rr} - S_{lr}}{2} = \frac{T_r}{2W}\sin\theta_s$$

C. Mechanical Embodiments

Referring to FIGS. 8 through 23, in one embodiment, the transmission control device 14 includes a mechanical apparatus which includes: (a) an upper mount 109 rigidly connected to a lower mount 111, which, in turn, is rigidly connected to the tractor frame 18 (b) a pivoting force receiver-transmitter, pivoting member or common rocker 110, pivotally connected to the lower mount 111, which receives foot pedal input to set the desired or reference speed; (c) a rotatable steer input device or steer crank assembly 114, rotatably mounted to the lower mount 111, which receives steering input from the timed steering belt 200 described below; (d) a plurality of idler pulleys 115 for rotatably guiding the timed steering belt 200; (e) a drive multiplier 116, preferably identical to the steer multiplier 112, which is coupled to the steer crank assembly 114 and the common rocker 110; (f) a pivoting drive transmission input or command device 120, which provides a command or input to the drive transmission 30; (g) a steer multiplier 112 which is coupled to the steer crank assembly 114 and the common rocker 110; and (h) a pivoting steer transmission input or command device 122 which provides command input to the steer transmission 32.

In this embodiment, the common rocker 110 is a mechanical implementation of the drive input receiver 100. The steer crank assembly 114 is a mechanical implementation of the steer input receiver 102. The steer crank assembly 114 preferably includes: (a) a preferably circular steer crank assembly 114; (b) a drive crank arm 129; and (c) a steer crank arm (not shown). The drive multiplier 116 and the steer multiplier 112, in conjunction with the common rocker 110 and steer crank assembly 114, include a mechanical implementation of the converter 104. The pivoting drive transmission input or command device 120 is a mechanical implementation of the drive transmission input or command device 106, and the pivoting steer transmission input device 122 is a mechanical implementation of the steer transmission input or command device 108.

Figure 12:
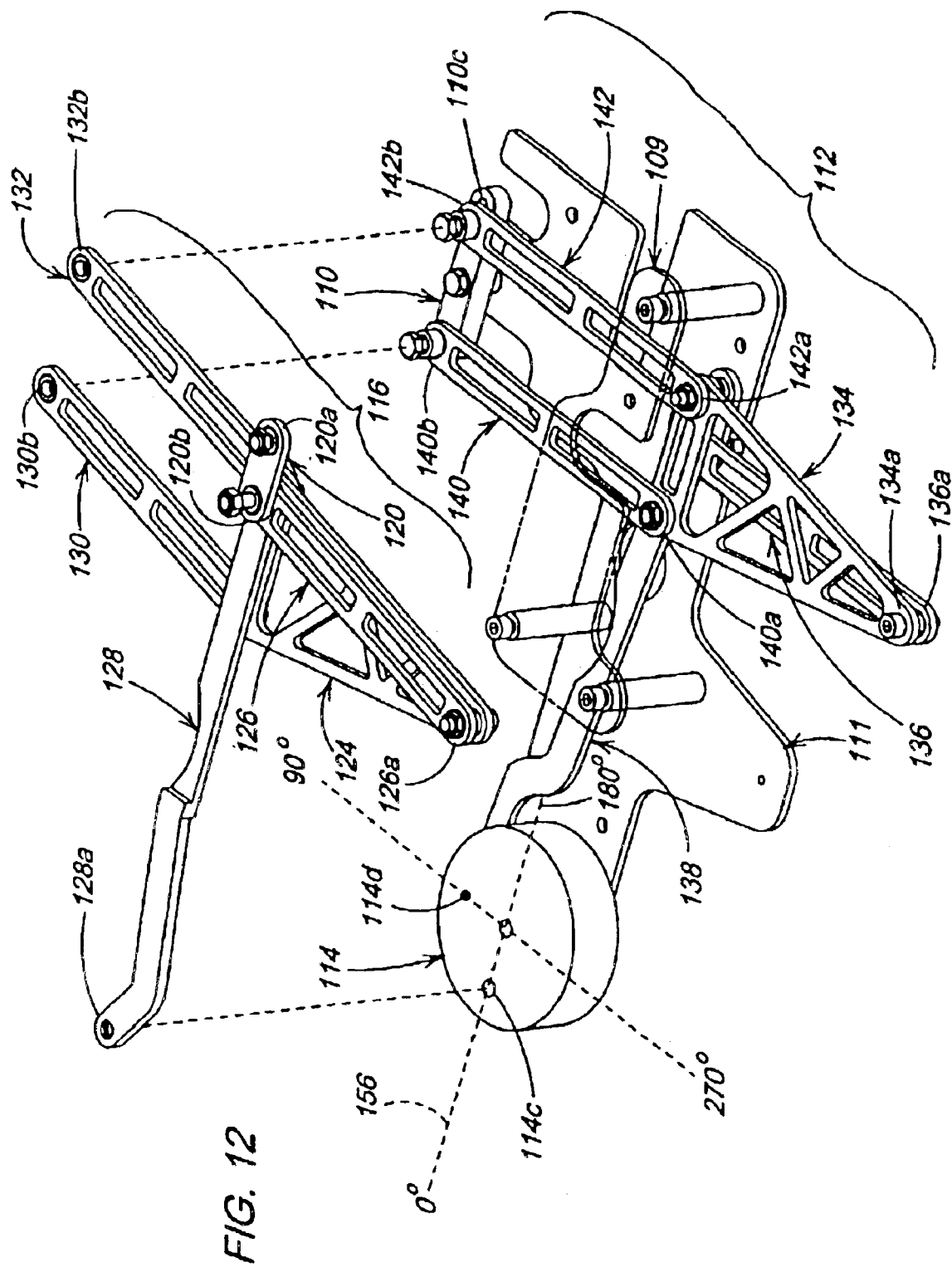
FIG. 12 is an exploded rear top perspective view of the transmission control device in a neutral position, showing the drive multiplier separated from the steer multiplier in one embodiment of the present invention.
Figure 13:
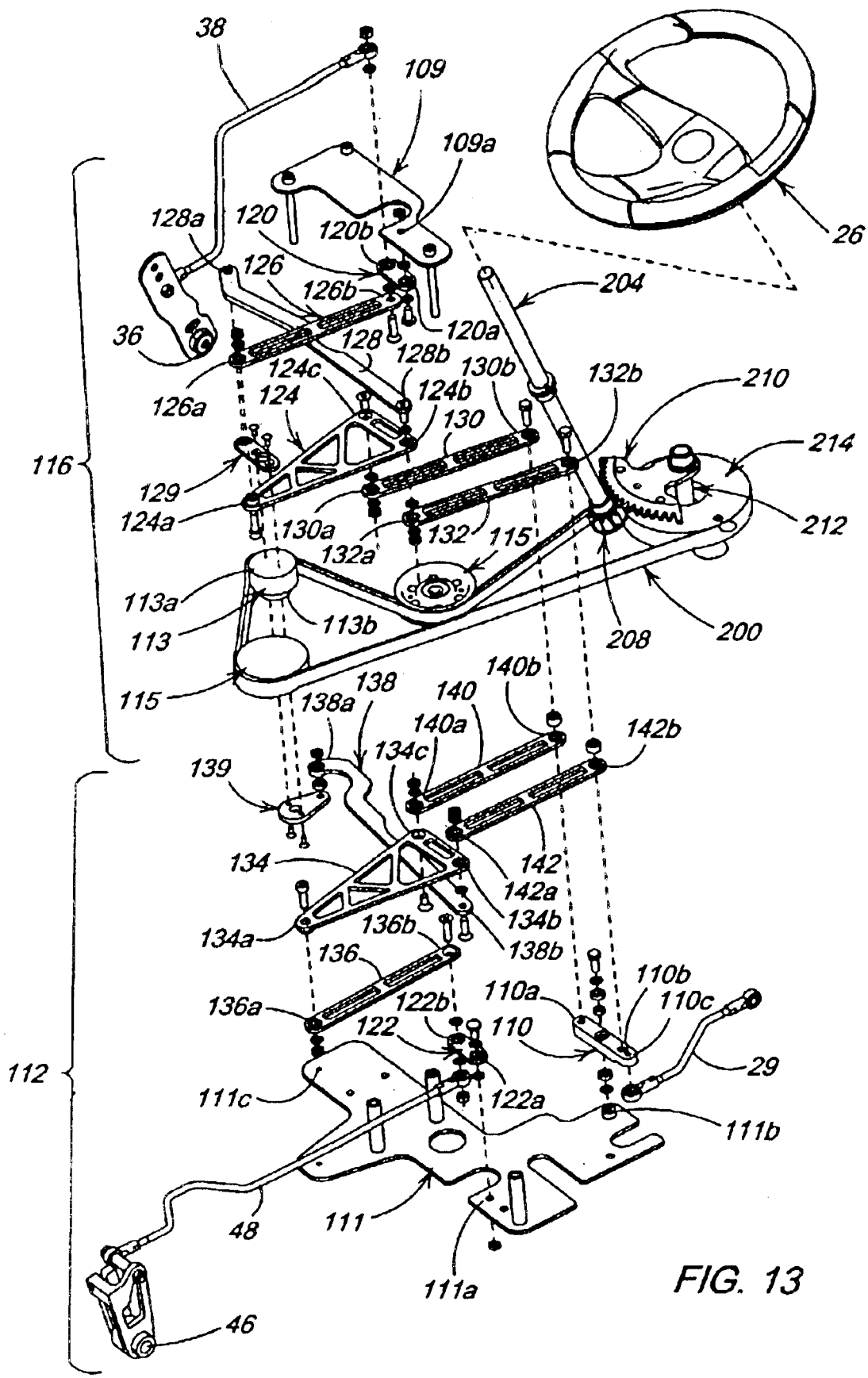
FIG. 13 is an exploded rear top perspective view of the transmission control device in a neutral position, showing the components of the drive multiplier separated from the components of the steer multiplier in one embodiment of the present invention.
Figure 14:
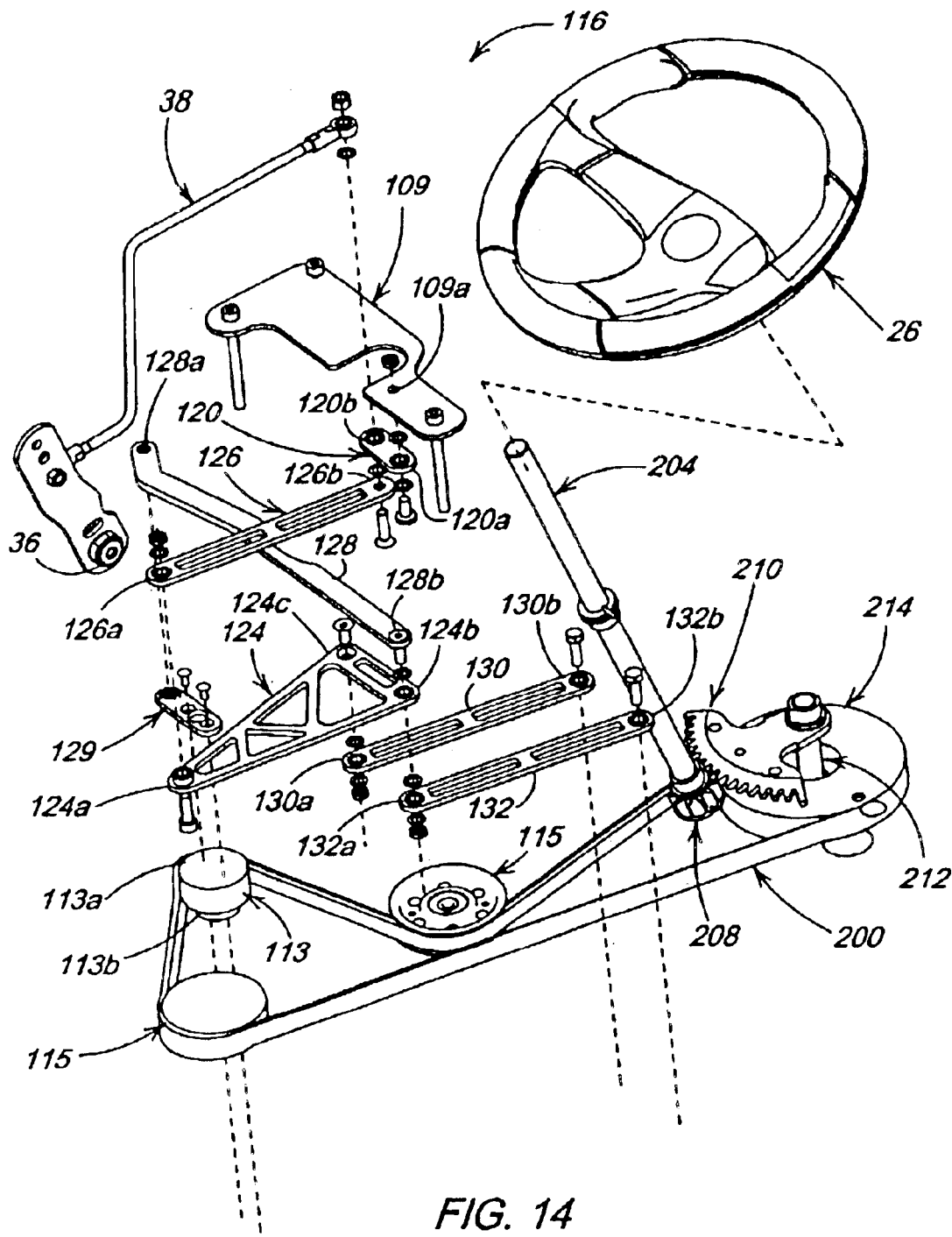
FIG. 14 is an exploded rear top perspective view of the components of the drive multiplier of the transmission control device in a neutral position in one embodiment of the present invention.

As best shown in FIGS. 12, 13 and 14, the drive multiplier 116 includes: (a) a pivoting, preferably triangular, neutral control member 124; (b) a force transmitter, referred to herein as a drive transmitter 126, coupled to the neutral control member 124; (c) a drive crank arm 129 rigidly attached to the steer crank assembly 114 which couples the steer crank assembly 114 to a drive arm or drive connecting rod 128 which, in effect, couples the drive crank arm 129 to the neutral control member 124; (d) an elongated pivoting member 130 which couples the neutral control member 124 to the common rocker 110; and (e) an elongated pivoting member 132 which couples the neutral control member 124 to the common rocker 110.

Specifically, the drive transmitter 126 has an end 126a pivotally connected to the corner 124a of the neutral control member 124. The end 126b of the drive transmitter 126 is pivotally connected to the end 120b of the drive transmission input or command device 120. The drive connecting rod 128 has an end 128a which is pivotally connected to the drive crank arm 129 which, in turn, is rigidly connected to the upper surface 113a of the steer crank assembly 114. The end 128b of the drive connecting rod 128 is pivotally connected to the corner 124b of the neutral control member 124. The pivoting member 130 has an end 130a which is pivotally connected to the corner 124c of the neutral control member 124. The end 130b of the pivoting member 130 is pivotally connected, at opening 110a, to the common rocker 110. The pivoting member 132 has an end 132a which is pivotally connected to the corner 124b of the neutral control member 124. The end 132b of the pivoting member 132 is pivotally connected, at opening 110b, to the common rocker 110. The end 110c of the common rocker 110 is pivotally connected, at opening 110c, to the foot pedal linkage 29.

Figure 15:
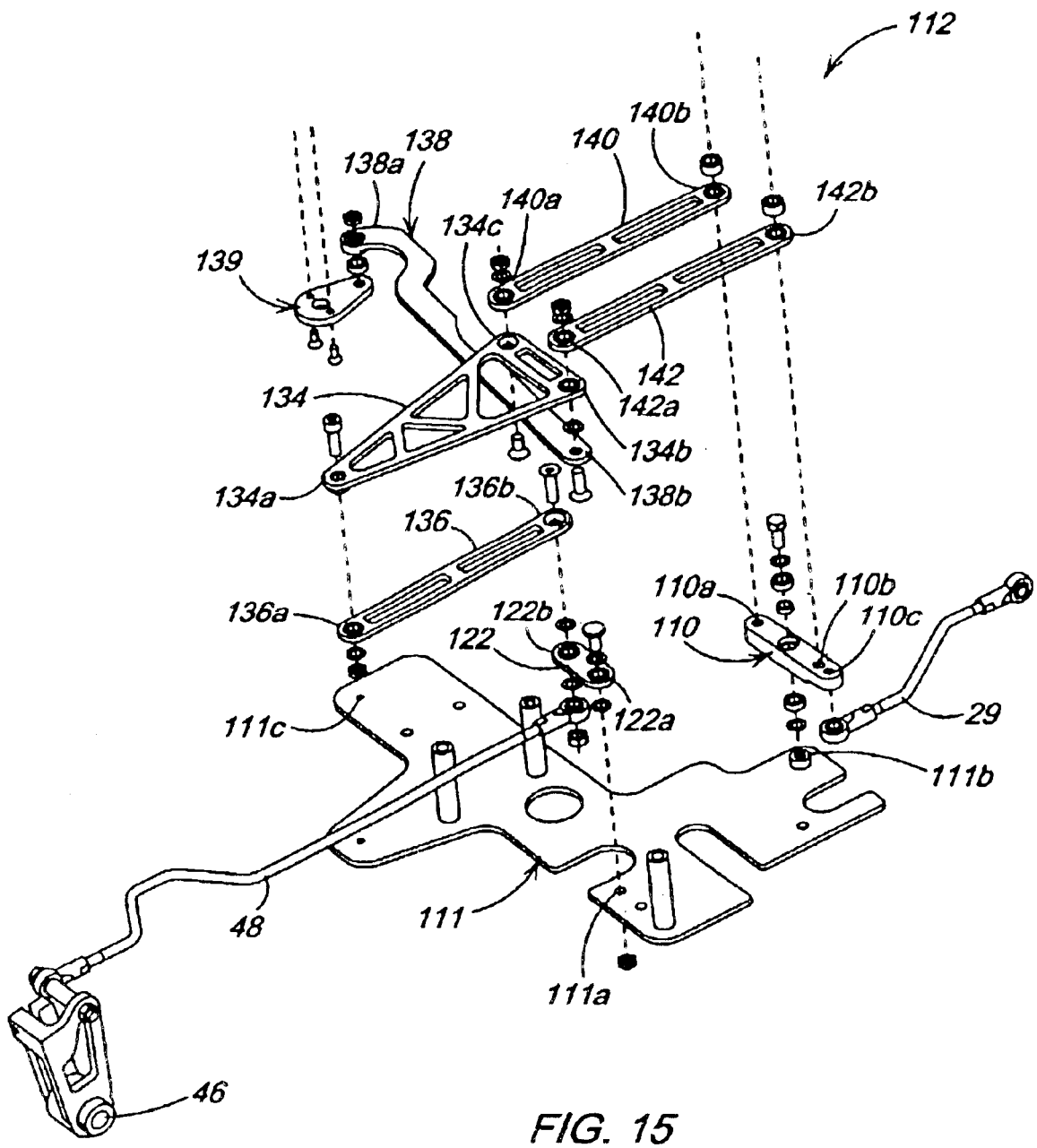
FIG. 15 is an exploded rear top perspective view of the components of the steer multiplier of the transmission control device in a neutral position in one embodiment of the present invention.

At best shown in FIGS. 12, 13 and 15, the steer multiplier 112 includes: (a) a pivoting, preferably triangular, neutral control member 134; (b) a force transmitter, referred to herein as a steer transmitter 136, coupled to the neutral control member 134; (c) a steer crank arm 139 rigidly attached to the steer crank assembly 114 which, in effect, couples the steer crank assembly 114 to a steer arm or steer connecting rod 138, which, in effect, couples the steer crank arm 139 to the neutral control member 134; (d) an elongated pivoting member 140 which couples the neutral control member 134 to the common rocker 110; and (e) an elongated pivoting member 142 which couples the neutral control member 134 to the common rocker 110.

Specifically, the steer transmitter 136 has an end 136a pivotally connected to the corner 134a of the neutral control member 134. The end 136b of the steer transmitter 136 is pivotally connected to the end 122b of the steer transmission input or command device 122. The steer connecting rod 138 has an end 138a which is pivotally connected to the steer crank arm (not shown) which, in turn, is rigidly connected to the lower surface 113b of the steer crank assembly 114. The end 138b of the steer connecting rod 138 is pivotally connected to the corner 134b of the neutral control member 134. The pivoting member 140 has an end 140a which is pivotally connected to the corner 134c of the neutral control member 134. The end 140b of the pivoting member 140 is pivotally connected, at opening 110a, to the common rocker 110. The pivoting member 142 has an end 142a which is pivotally connected to the corner 134b of the neutral control member 134. The end 142b of the pivoting member 142 is pivotally connected, at opening 110b, to the common rocker 110.

The upper mount 109 and the lower mount 111 provide support for the steer crank assembly 114, the common rocker 110, the steer multiplier 112 and the drive multiplier 116. The end 120a of the drive transmission input or command device 120 is pivotally connected to the upper mount 109 at position 109a. The end 122a of the steer transmission input or command device 122 is pivotally connected to the lower mount 111 at position 111a. As described above, the common rocker 110 is pivotally connected to the lower mount 111 at position 111b, and the steer crank 114 is rotatably connected to the lower mount 111 at position 111c. Various pins, bolts, nuts, spacers, ball joints, bushings and other suitable fasteners can be used to make the pivotal and rigid connections in the transmission control device 14.

Figure 16:
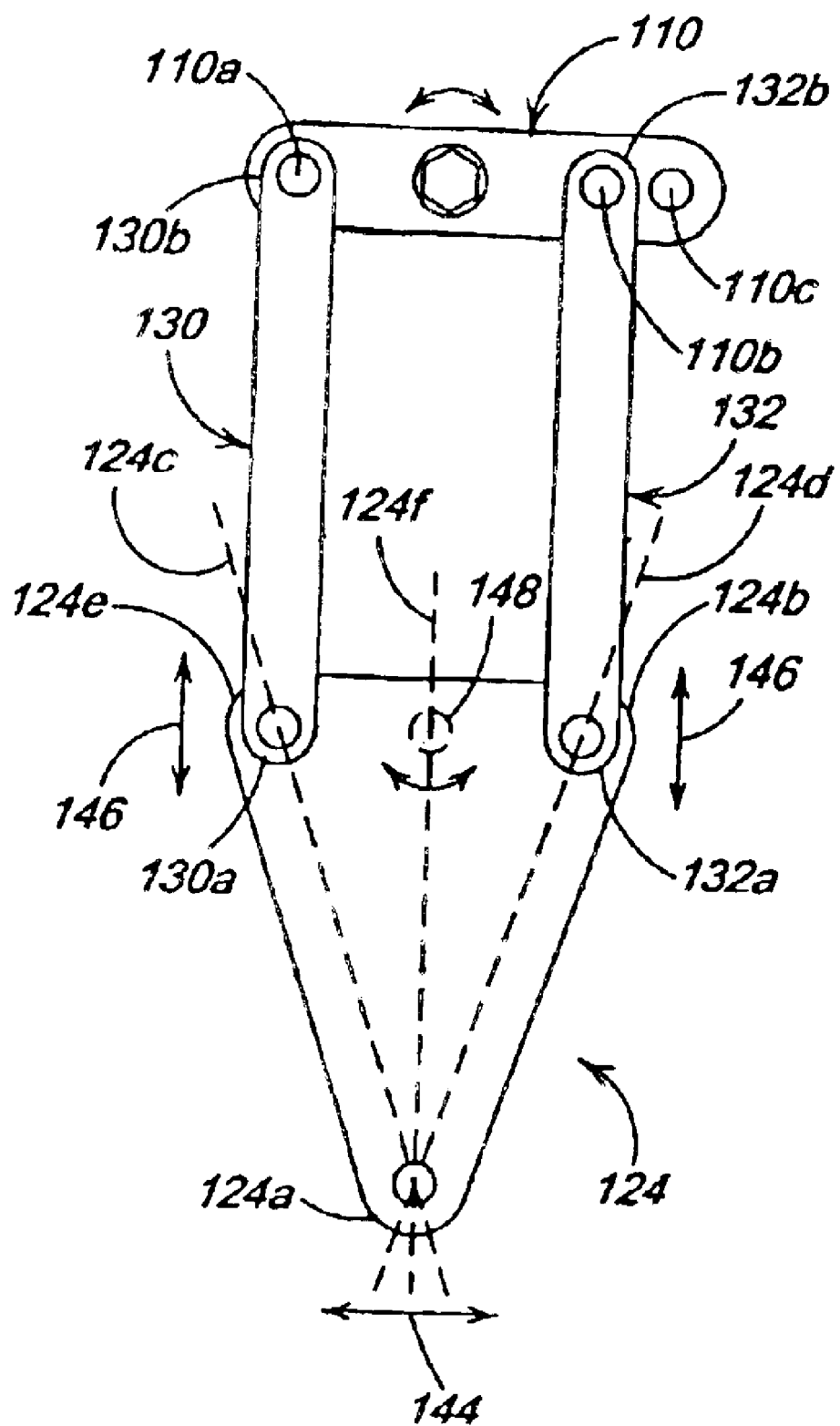
FIG. 16 is a top or plan view of the common rocker, pivoting members and neutral control member of the drive multiplier in one embodiment of the present invention.

Referring to FIG. 16, because common rocker 110 is pivotally connected to lower mount 111, the corner 124a of neutral control member 124 has a lateral or side to side motion indicated by arrow 144, and the corners 124b and 124c have a fore-aft motion indicated by arrows 146. In contrast, the central pivot point 148 of the neutral control member 124 has no lateral or fore-aft motion. Therefore, the line from the corner 124a to the central pivot point 148 defines a neutral axis 124f. This axis 124f is referred to as neutral because when the drive transmitter 126 is aligned along axis 124f, the drive transmitter 126 does not transmit any motion to the drive transmission input or command device 120. It should be appreciated that the drive transmitter 126 will transmit varying degrees of motion to the drive transmission input or command device 120 when the drive transmitter 126 is positioned between the neutral axis 124f and the non-neutral axes 124d or 124e.

The line from the corner 124a to the corner 124b defines a first non-neutral axis 124d, and the line from the corner 124a to the corner 124c defines a second non-neutral axis 124e. These axes 124d and 124e are referred to as non-neutral axes because when the drive transmitter 126 is aligned along axis 124d, the drive transmitter 126 will transmit all of the motion from the common rocker 110 to the drive transmission input or command device 120 and when the drive transmitter 126 is aligned along axis 124e, the drive transmitter 126 will transmit motion equal in magnitude and opposite in direction from that of the common rocker 110 to the drive transmission command input device 120.

Figure 17:
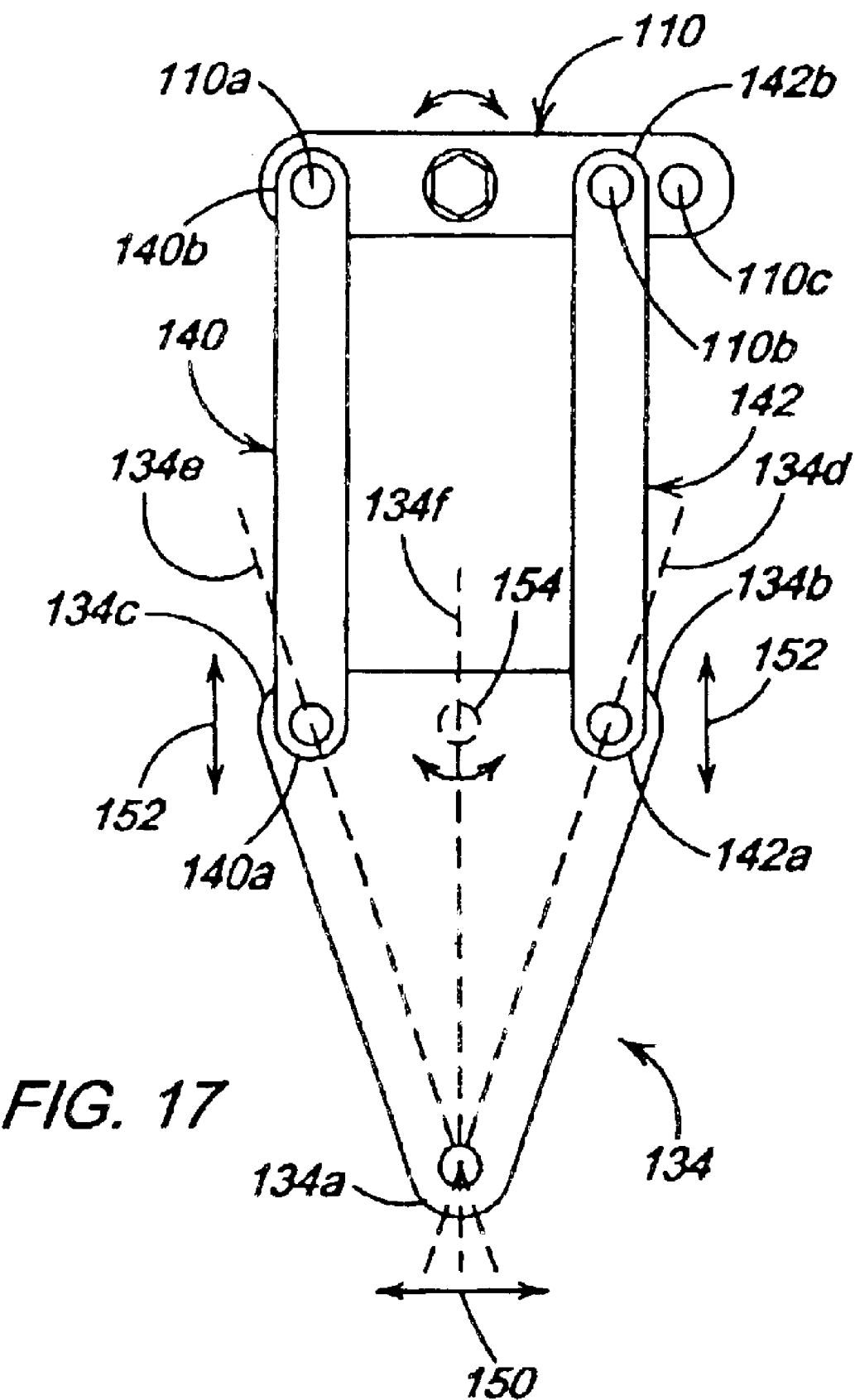
FIG. 17 is a top or plan view of the common rocker, pivoting members and neutral control member of the steer multiplier in one embodiment of the present invention.

Referring to FIG. 17, because common rocker 110 is pivotally connected to mount 111, the corner 134a of neutral control member 134 has a lateral or side to side motion indicated by arrow 150, and the corners 134b and 134c have a fore-aft motion indicated by arrows 152. In contrast, the central pivot point 154 of the neutral control member 134 has no lateral or fore-aft motion. Therefore, the line from the corner 134a to the central pivot point 154 defines a neutral axis 134f. This axis 134f is referred to as neutral because when the steer transmitter 136 is aligned along axis 134f, the steer transmitter 136 does not transmit any motion to the steer transmission command output device 122. It should be appreciated that the steer transmitter 136 will transmit varying degrees of motion to the steer transmission input or command device 122 when the drive transmitter 136 is positioned between the neutral axis 134*f* and the non-neutral axes 134*d* or 134*e*.

The line from the corner 134*a* to the corner 134*b* defines a first non-neutral axis 134*d*, and the line from the corner 134*a* to the corner 134*c* defines a second non-neutral axis 134*e*. These axes 134*d* and 134*e* are referred to as non-neutral axes because when the steer transmitter 136 is aligned along axis 134*d*, the steer transmitter 136 will transmit all of the motion from the common rocker 110 to the steer transmission command input device 122 and when the steer transmitter 136 is aligned along axis 134*e*, the steer transmitter 136 will transmit motion equal in magnitude and opposite in direction from that of the common rocker 110 to the steer transmission command output device 122. When the drive transmitter 126 has a non-neutral position 124*d* or 124*e*, the common rocker 110 transmits fore-aft motion to the drive transmitter 126. When the steer transmitter 136 has a non-neutral position 134*d* or 134*e*, the common rocker 110 transmits fore-aft motion to the steer transmitter 136. In any case, if the common rocker 110 is in the neutral position, no input will be transmitted to the transmission assembly 12, and the tractor 10 will not move.

The neutral control members 124 and 134 have a neutral function which accommodates the neutral positions of the steering device 26 and the foot pedals 28*a* and 28*b*. The steering device 26 of the tractor 10 may be described herein as having a neutral position when there is no steering angle. The foot pedals 28*a* and 28*b* of tractor 10 may be described herein as having a neutral position when the user's foot is not in contact with the foot pedals 28*a* and 28*b*.

Figure 18:
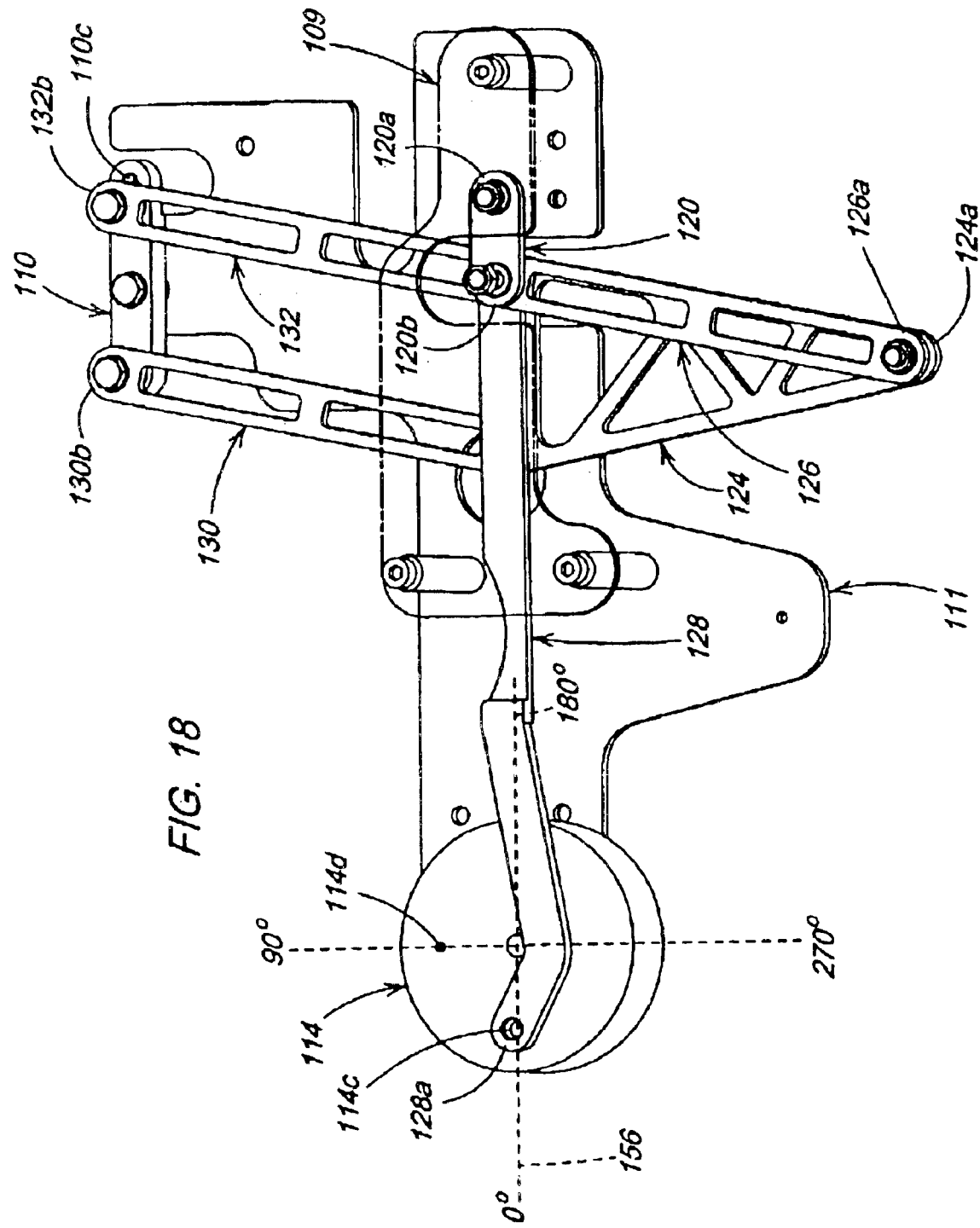
FIG. 18 is a rear top perspective view of the drive multiplier of the transmission control device, illustrating the position of the drive multiplier when the steering device is in neutral and the foot pedals are in neutral in one embodiment of the present invention.
Figure 19:
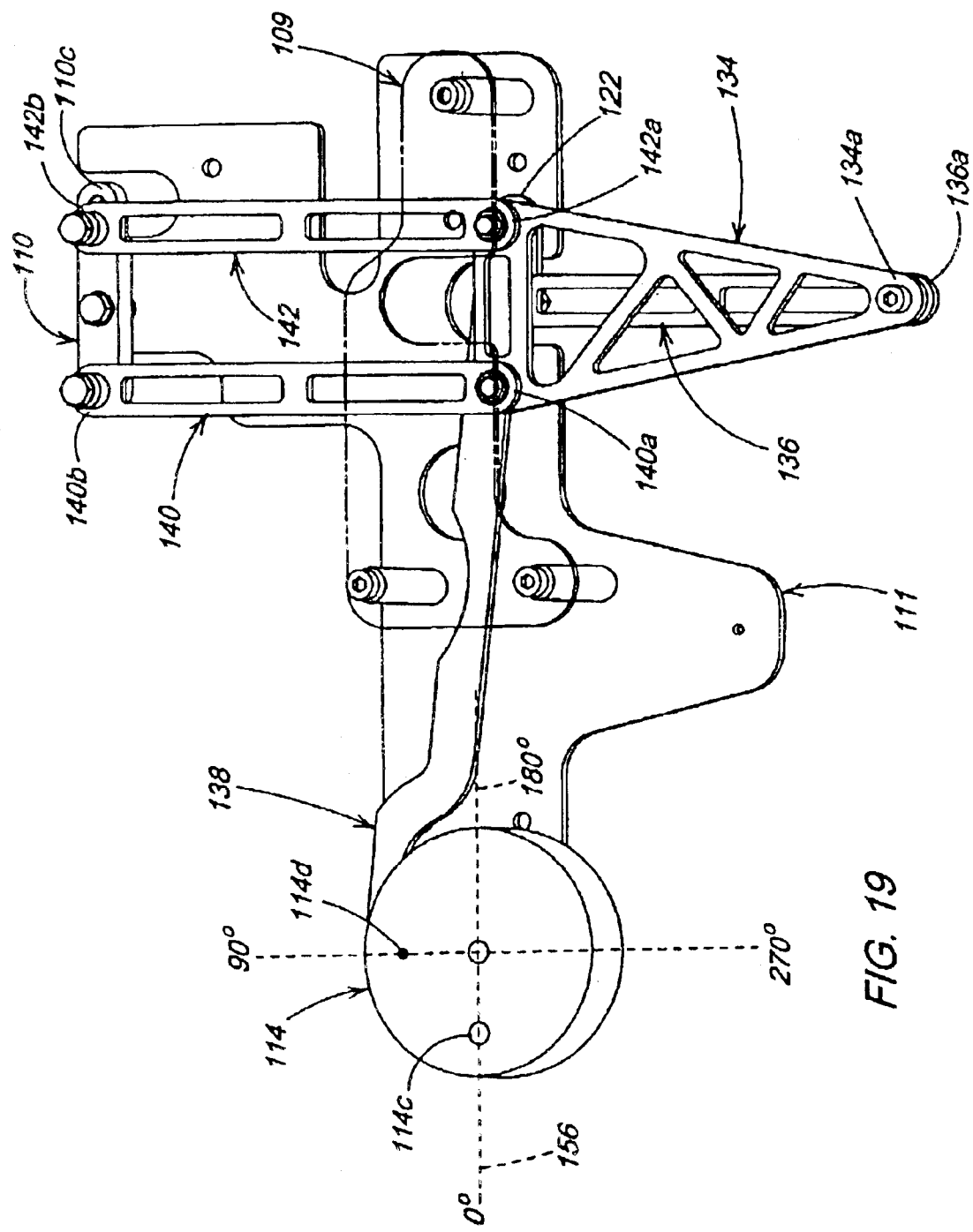
FIG. 19 is a rear top perspective view of the steer multiplier of the transmission control device, illustrating the position of the steer multiplier when the steering device is in neutral and the foot pedals are in neutral in one embodiment of the present invention.

As illustrated in FIGS. 18 and 19, when the steering device 26 is in neutral and the foot pedals 28*a* and 28*b* are in neutral, the transmission control device 14 is configured so that: (a) the drive crank arm connection point on steer crank assembly 114 is positioned at zero degrees; (b) the steer crank arm connection point (not shown) is positioned at ninety degrees on the lower surface 113*b* of the steer crank assembly 114 which provides steering input; (c) the drive transmitter 126 is aligned with the non-neutral axis 124*d* of the neutral control member 124; (d) the steer transmitter 136 is aligned with the neutral axis 134*f* of the neutral control member 134; and (e) the axis of the common rocker 110 is parallel to line 156.

Figure 20:
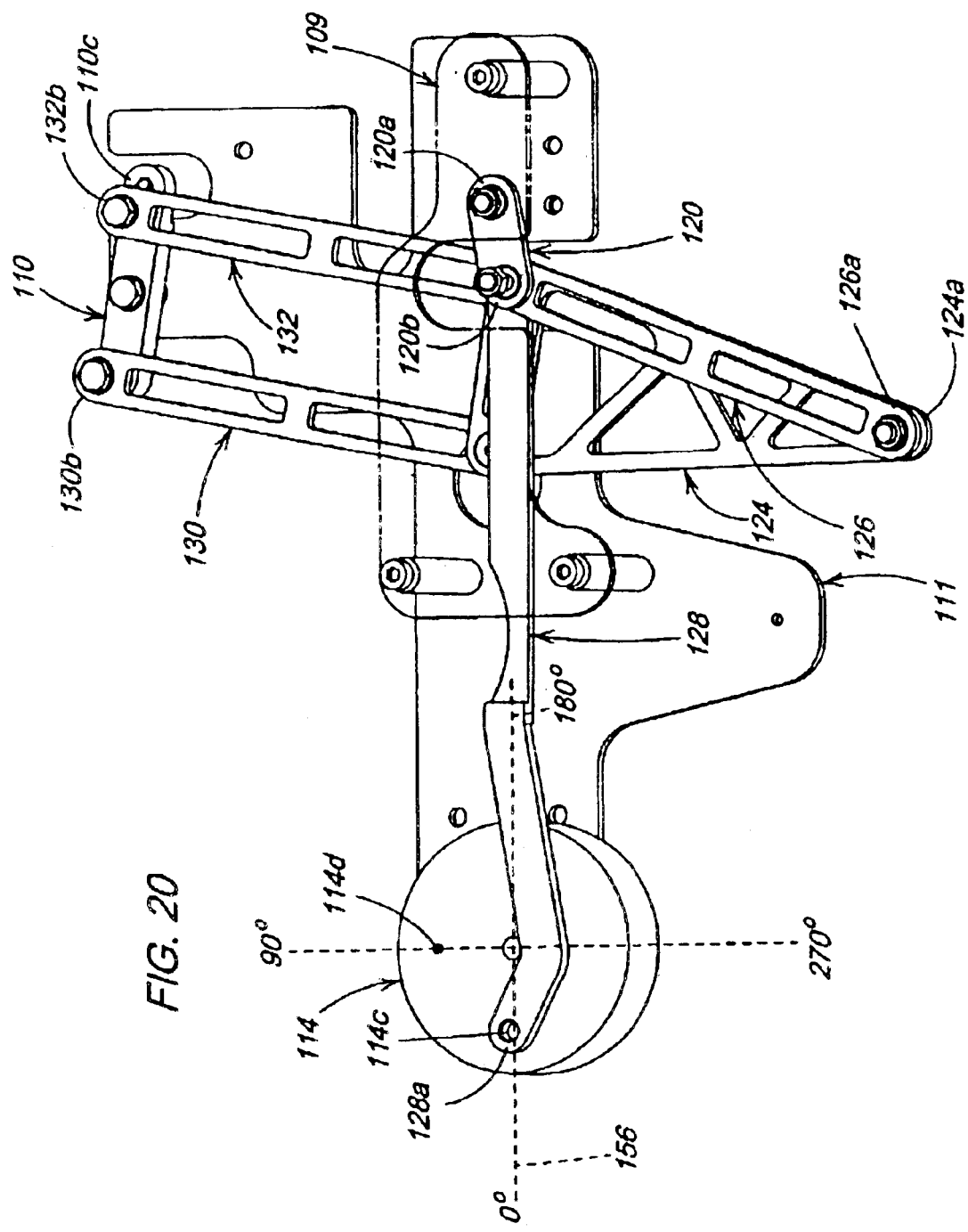
FIG. 20 is a rear top perspective view of the drive multiplier of the transmission control device, illustrating the position of the drive multiplier when the steering device is in neutral and one of the foot pedals is depressed in one embodiment of the present invention.
Figure 21:
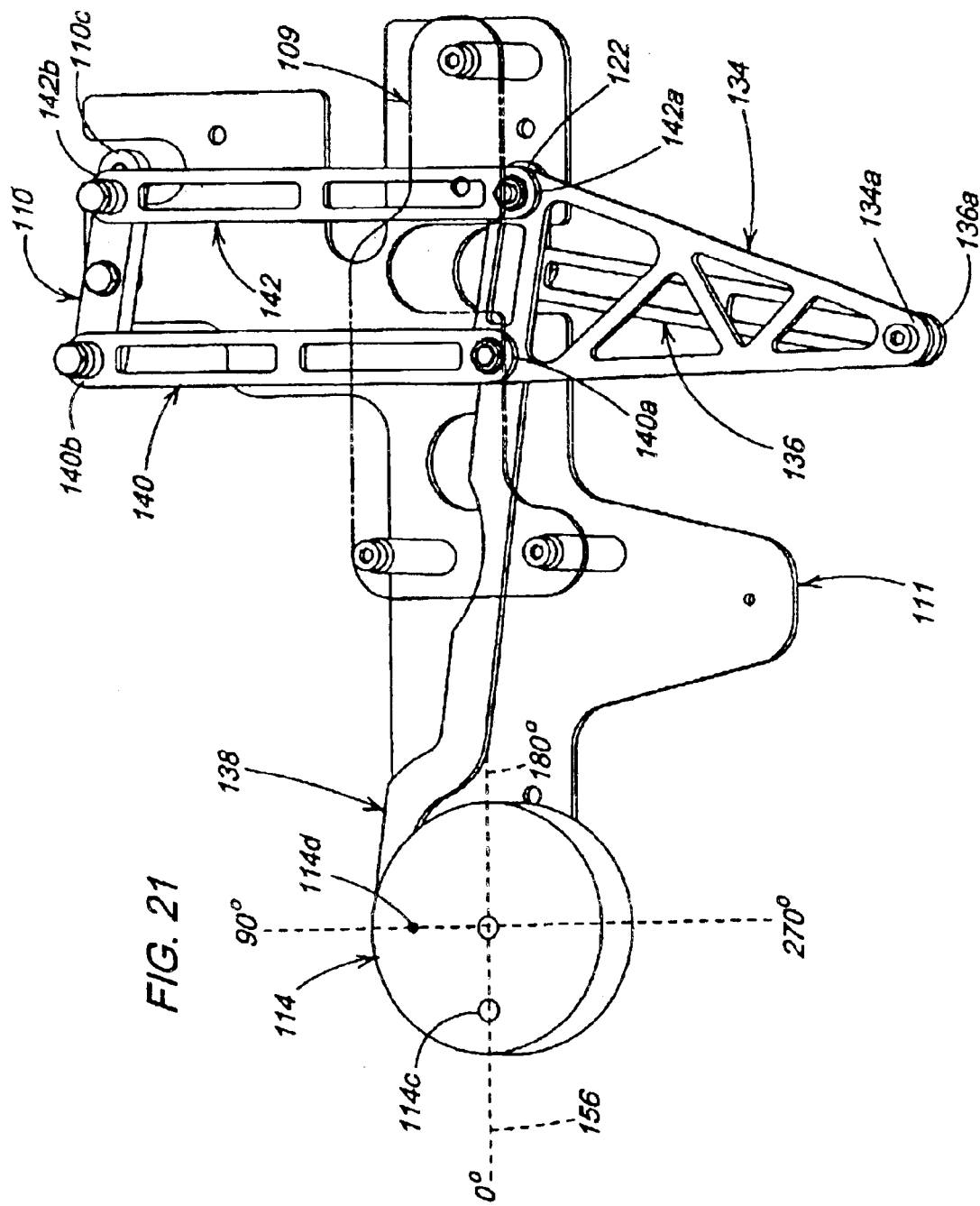
FIG. 21 is a rear top perspective view of the steer multiplier of the transmission control device, illustrating the position of the steer multiplier when the steering device is in neutral and one of the foot pedals is depressed in one embodiment of the present invention.

As illustrated in FIGS. 20 and 21, when the user holds the steering device 26 in a neutral position while making a foot pedal input, the common rocker 110 receives this input, resulting in: (a) input to the drive transmission 30, causing the tractor 10 to propel forward or backward; and (b) no input to the steer transmission 32. This is because, when the steering device 26 is neutral, the drive transmitter 126 is in a non-neutral position 124*d* while the steer transmitter 136 is in a neutral position 134*f*.

Figure 22:
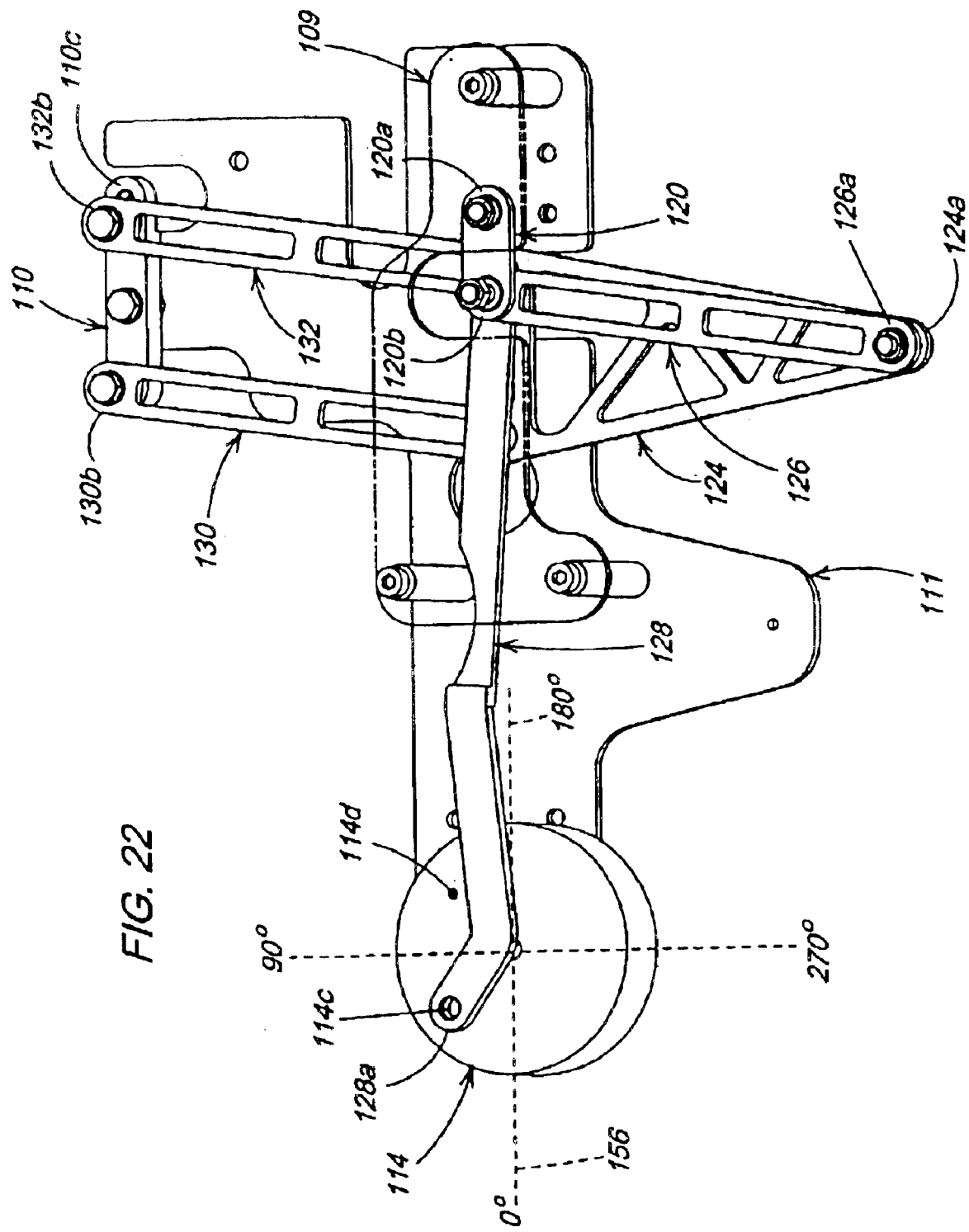
FIG. 22 is a rear top perspective view of the drive multiplier of the transmission control device, illustrating the position of the drive multiplier when the steering device is turned to a half lock in one direction and the foot pedals are in a neutral position in one embodiment of the present invention.
Figure 23:
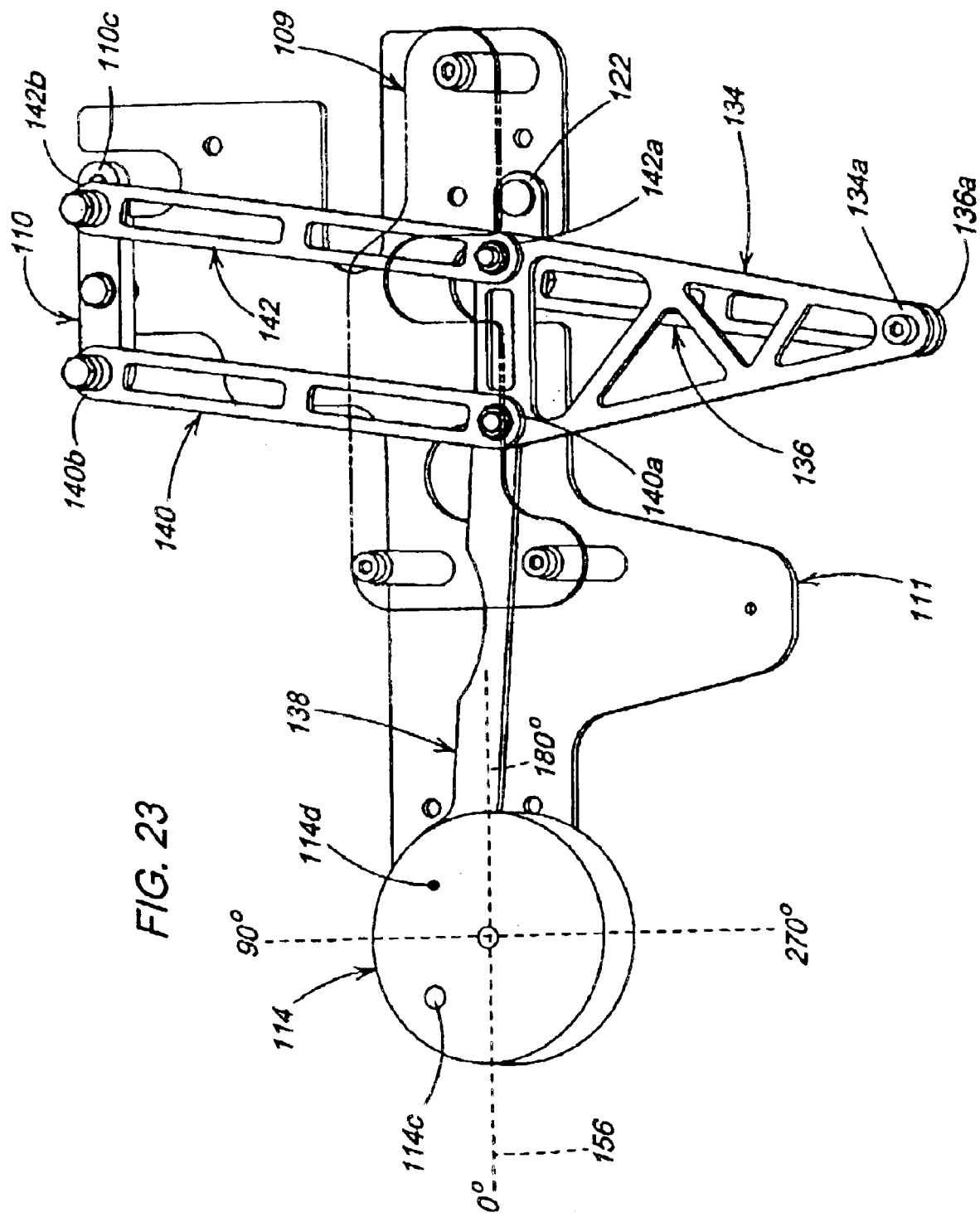
FIG. 23 is a rear top perspective view of the steer multiplier of the transmission control device, illustrating the position of the steer multiplier when the steering device is turned to a half lock in one direction and the foot pedals are in a neutral position in one embodiment of the present invention.

As illustrated in FIGS. 22 and 23, when the user turns the steering device 26 in one direction to a half lock while not making a foot pedal input: (a) the steer transmitter 136 moves to a non-neutral position 134*d*; (b) the drive transmitter 126 moves between the neutral position 124*f* and the non-neutral position 124*d*; and (c) the common rocker 110 does not pivot. Because the common rocker 110 remains in its neutral position, the tractor 10 does not move.

If the user turns the steering device 26 in one direction to a full lock position while making a foot pedal input, the common rocker 110 receives this input, resulting in: (a) no input to the drive transmission 30; and (b) input to the steer transmission 32. This is because the drive transmitter 126 would be aligned with the neutral axis 124*f*, and the steer transmitter 136 would be aligned with one of the non-neutral axes 134*d* or 134*e*. As a result, the drive transmission 30 would receive no input, the steer transmission 32 would receive input and the tractor 10 would execute a substantially zero radius turn.

If the user turns the steering device 26 in one direction to less than a full lock position while making a foot pedal input, the common rocker 110 receives this input, resulting in: (a) input to the drive transmission 30; and (b) input to the steer transmission 32. This is because the drive transmitter 126 would not be aligned with the neutral axis 124*f*, and the steer transmitter 136 would be aligned between the neutral axis 134*f* and one of the non-neutral axes or 134*e*. As a result, the drive transmission 30 would receive input, the steer transmission 32 would receive input and the tractor 10 would execute a turn at the selected radius.

Referring back to FIGS. 12 and 13, the end 128*a* of the drive connecting rod 128 is mounted to the steer crank assembly 114 at a select location 114*c* along the circumference of the steer crank assembly 114. The end 138*a* of the steer connecting rod 138 is connected to the steer crank assembly 114 at a location (not shown) along the circumference of the lower surface 113*b* of the steer crank assembly 114. This location is directly underneath location 114*d* which is ninety degrees apart from the location 114*c*. This ninety degree difference in location causes the steer multiplier 112 to move out of phase with respect to the drive multiplier 116.

The motion of the multipliers 112 and 116 thus conforms to a sinusoidal pattern. Specifically, the input transmitted to the drive transmission input or command device 120 is proportional to the product of: (a) the foot pedal input; and (b) the cosine of the steer angle. In addition, the input transmitted to the steer transmission input device 122 is proportional to the product of: (a) the foot pedal input; and (b) the sine of the steer angle. Accordingly, when the user is traveling forward or backward while holding the steering device 26 in a straight, neutral position, the transmission control device 14 produces an input for the drive transmission 30 and no input for the steer transmission 32. When the user is traveling forward or backward while turning the steering device 26, the transmission control device 14 produces an input for the drive transmission 30 and an input for the steer transmission 32. It is probable that when the maximum speed generated by the steer input alone is equal to the product of $T/(2W)$ and the maximum speed generated by the foot pedal input alone, the rear wheel speeds will be coordinated with the steering input for all foot pedal command or inputs. As described above, T represents the distance between each rear tire, and W represents the wheelbase.

Figure 24:
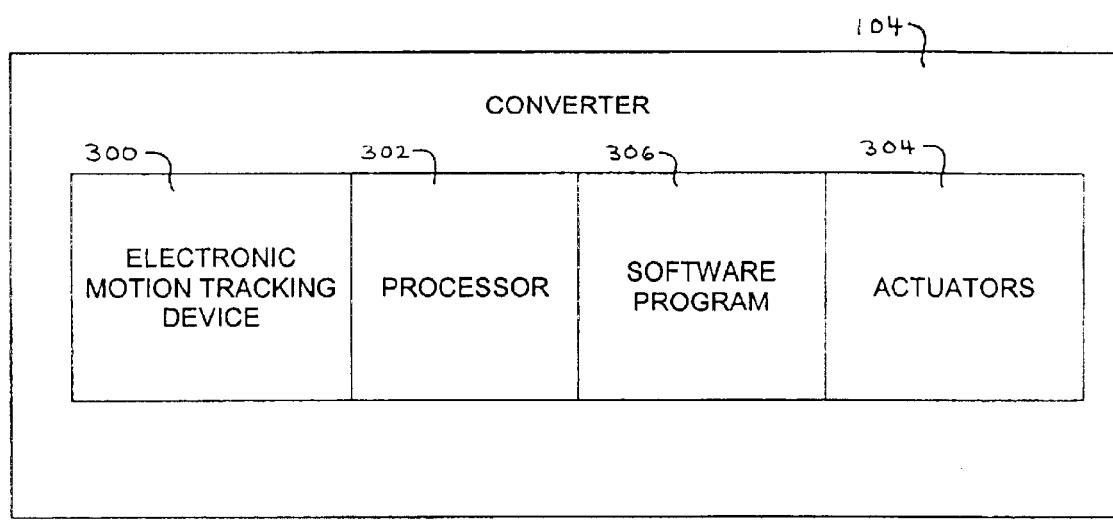
FIG. 24 is a schematic block diagram illustrating the electronic converter of the transmission control device in one embodiment of the present invention.

In other embodiments of the transmission control device 14, the drive input receiver 100, steer input receiver 102, converter 104, drive transmission input device 106 and/or a steer transmission input device 108 can each include one or more electrical or electronic devices including, without limitation, motors, actuators, solenoids, computer processors, memory devices, electrical wires and circuit boards. In one embodiment illustrated in FIG. 24, the converter 104 includes: (a) one or more electronic motion tracking devices 300 which track the motion of the drive input receiver and the steer input receiver; (b) a processor 302 in communication with the motion tracking devices; and (c) a plurality of actuators 304, controlled by the processor, which are adapted to engage the drive transmission input device 106 and the steer transmission input device 108. The converter 104 can also include one or more software programs 306 which include part or all of the logic and equations for the transmission control device 14 described above. In such embodiment, the processor uses such software programs to control the actuators.

D. Electronically Controlled Embodiments

In other embodiments of the transmission control device 14, the drive input receiver 100, steer input receiver 102, converter 104, drive transmission input device 106 and/or a steer transmission input device 108 can each include one or more electrical or electronic devices including, without limitation, motors, actuators, solenoids, computer processors, memory devices, electrical wires and circuit boards. In one embodiment, the converter 104 includes: (a) one or more electronic motion tracking devices (not shown) which track the motion of the drive input receiver and the steer input receiver; (b) a processor (not shown) in communication with the motion tracking devices; and (c) a plurality of actuators (not shown), controlled by the processor, which are adapted to engage the drive transmission input device 106 and the steer transmission input device 108. The converter 104 can also include one or more software programs which include part or all of the logic and equations for the transmission control device 14 described above. In such embodiment, the processor uses such software programs to control the actuators.

In operation of one embodiment, the drive input receiver 100 receives input from the foot pedals 28a and 28b, and the steer input receiver 102 receives input from the steering device 26. The motion tracking devices produce electrical current, data or other output which corresponds to the magnitude and direction of these inputs. The processor uses the output from the motion tracking devices to control the actuators. The actuators, as controlled by the processor, transmit inputs to the drive transmission input device 106 and the steer transmission input device 108 to control the speed and direction of the tractor 10.

The transmission control device, in one embodiment of the present invention, includes a steering input receiver, a foot pedal input receiver and an input converter. The input converter receives inputs from such input receivers and produces certain outputs to the drive transmission and different outputs to the steer transmission. In one embodiment, the input converter is entirely mechanical including a plurality of pivoting linkages and bars. Due to the symmetry of the input converter, whether the tractor is traveling forward or in reverse, the transmission control device causes the tractor to change direction in response to the user's steering in the same fashion an automobile changes direction in response to steering inputs.

III. Steering Assembly

Referring back to FIGS. 3 through 6 and 8 through 10, the steering assembly 16 in one embodiment of the present invention includes: (a) a steering input linkage 202; and (b) a front wheel assembly 203 for controlling the position of the front wheels 24a and 24b. The steering input linkage 202 transmits the user's steering input to the transmission control device 14 and to the front wheel assembly 203. The steering input linkage 202 preferably includes: (a) a steering device 26 controllable by the user; (b) a steering shaft 204 having a steering pinion gear 208 which couples the steering device 26 to a steering sector gear 210; (c) a steering sector gear shaft 212 which connects the steering sector gear 210 to a rotatable, preferably rounded or disk-shaped sprocket 214; (d) a timed steering belt 200 which drives steer crank assembly 114 and is maintained in a select configuration and at a select tension by pulleys 115 in the transmission control device 14; (e) a crank arm 216 coupled to the sector gear shaft 212; and (f) a steering input control assembly 218 which couples the crank arm 216 to the front wheel assembly 203.

The steering input control assembly 218 includes: (a) a steering rod or coupling member 220 pivotally connected to the crank arm 216; (b) a motion director or guide member 222, coupled to the coupling member 220, which guides the coupling member 220 along an arc-shaped path and; (c) a steering rod, steering arm, fore-aft member, push-pull rod or push-pull input member 224 coupled to the front wheel axle assembly 203. The guide member 222 preferably includes a mount 222a rigidly connected to the tractor frame 18 and a member 222b pivotally connected to the mount 222a. The member 222b is pivotally connected at point 222c to the end 220a of the coupling member. Also, the member 222b is pivotally connected at point 222c to the end 224a of the input member 224.

The front wheel assembly 203 includes: (a) an axle beam or axle 226; (b) a mount 228 which rigidly connects the axle 226 to the frame of the transverse slide assembly 238 described below; (c) substantially L-shaped wheel mount arms 230 and 232, pivotally connected to the axle 226, which are coupled to the front wheels 24a and 24b, respectively; (d) a pivoting right rocker 234, preferably having three sides, pivotally connected to input member 224 at point 234a, pivotally connected to a right tie rod 236 at point 234c and pivotally connected to axle 226 at point 234b; (e) a right tie rod 236 pivotally coupled to right rocker 234 at point 234c and pivotally coupled to the right wheel mount arm 230; (f) a relatively short tie rod or right coupling link 244 having an: (i) end 244a which is pivotally connected to the end 245b of sliding member 245; and (ii) a body 244a which is pivotally connected to the rocker 234 at point 234c and to the right tie rod 236; (g) a transverse slide assembly 238 containing a sliding member 245 having an end 245b which is pivotally connected to the right coupling link 244 and also having an end 245a which is pivotally connected to the relatively short tie rod or left coupling link 246; (h) a left coupling link 246 having an end 246a pivotally coupled to the transverse slide 245 and having an end 246b pivotally coupled to left rocker 242 at point 242a; (i) a left rocker 242 pivotally coupled to the end 240a of the left tie rod 240 at point 242a, to the axle 226 and to end 246b of the left coupling link 246 at point 242a; and (j) a left tie rod 240 with an end 240a pivotally connected to left rocker 242 at point 242a and a second end 240b pivotally connected to the left wheel mount arm 232, thereby coordinating the turning motion of the left wheel mount arm 232 with the turning motion of the right wheel mount arm 230.

Figure 4:
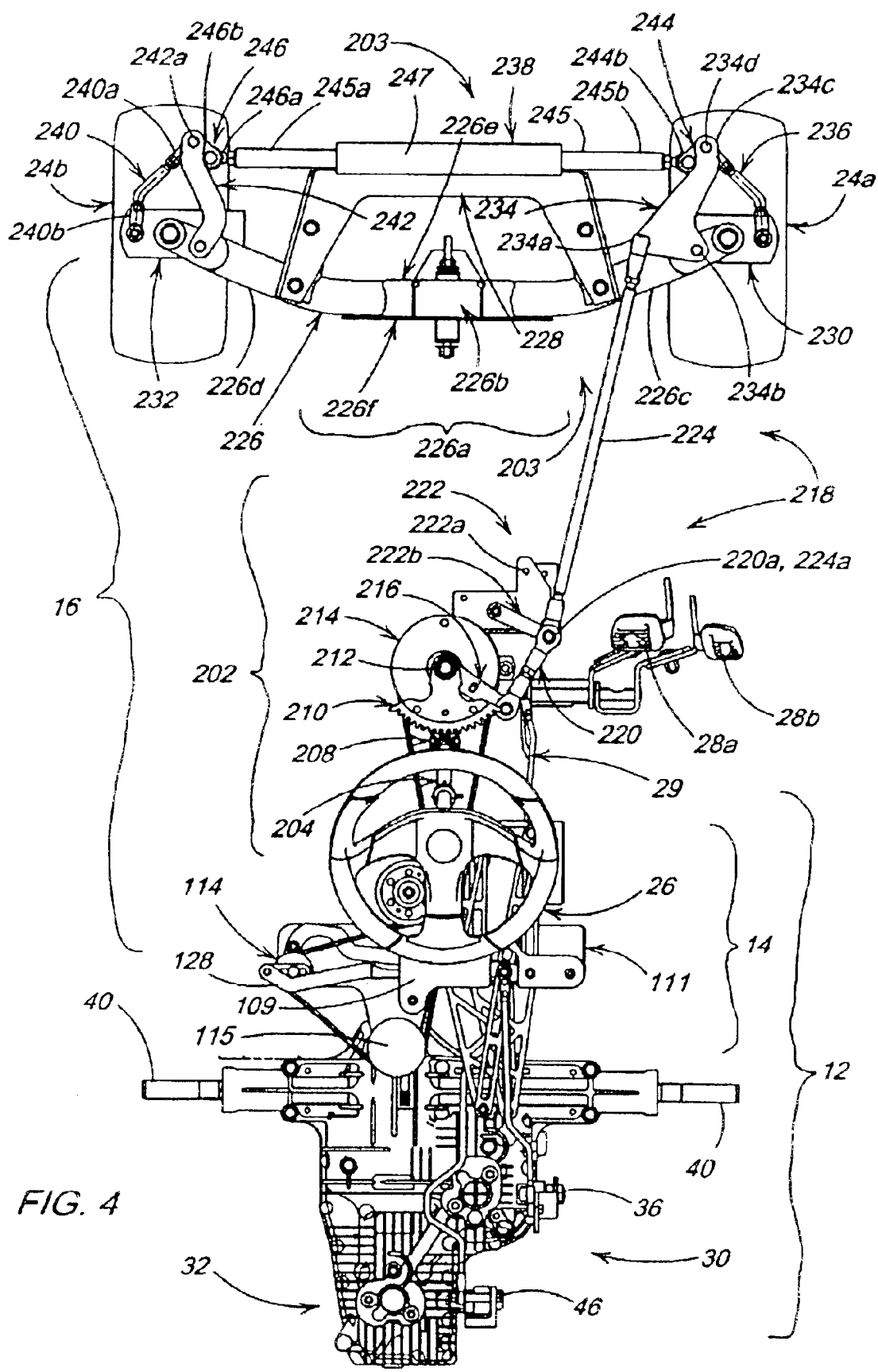
FIG. 4 is a top or plan view of a tractor showing only the transmission assembly and the steering assembly in one embodiment of the present invention.
Figure 5:
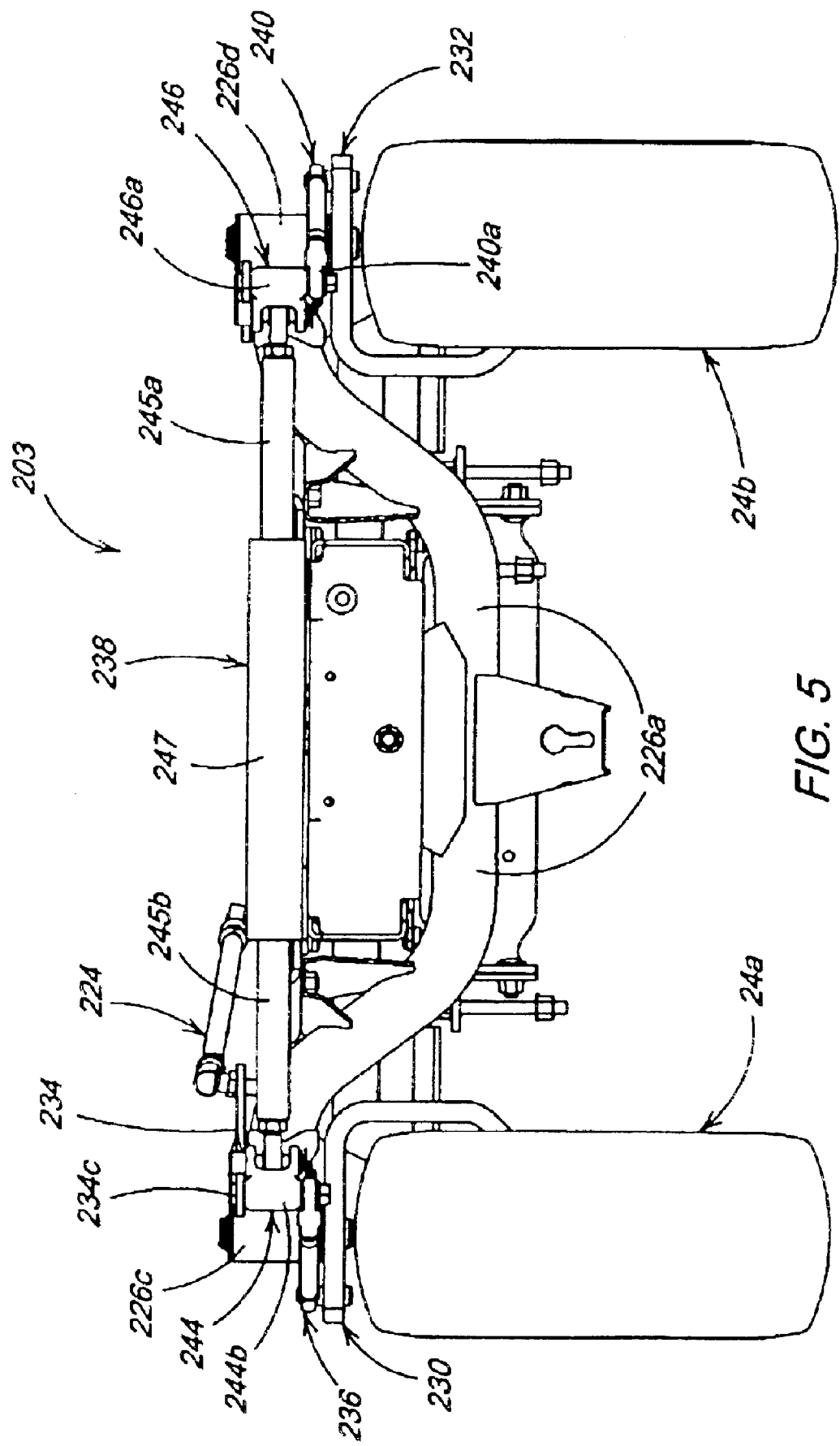
FIG. 5 is a front elevated view of the steering assembly in one embodiment of the present invention.
Figure 6:
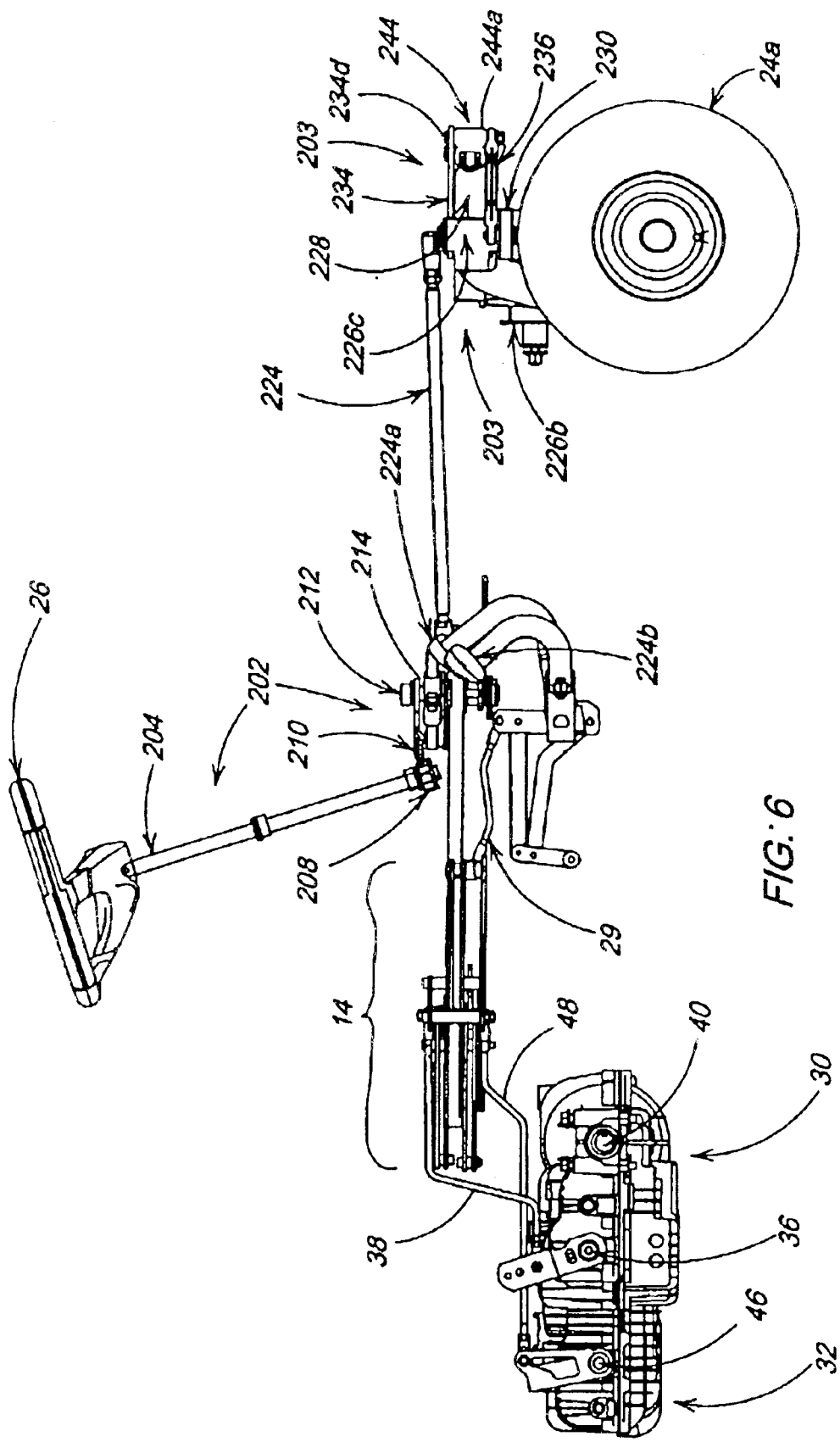
FIG. 6 is a side elevated view of the transmission assembly and the steering assembly of a tractor in one embodiment of the present invention.

The axle 226 includes a substantially straight central member or body 226a having a pivot member 226b, and the axle 226 also has two ends 226c and 226d. Preferably, the axle 226 has a generally C-shaped configuration from a top view, as illustrated in FIG. 4. Also, it is preferable that axle 226 has a generally U-shaped configuration from a front view, as illustrated in FIG. 5, wherein the ends 226c and 226d are positioned in a plane above the plane of the body 226a.

The pivoting right rocker 234 preferably has a portion 234a pivotally connected to the input member 224, a portion 234b pivotally connected to the end 226c of the axle 226 and a portion 234c pivotally connected to the right tie rod 236.

Preferably the tie rods 236 and 240 each have a bent shape defined by two intersecting axes. The angle between these two axes affects the ability of these links to clear the other parts during extreme turns.

The laterally transverse slide assembly 238 has a sliding member 245 with an end 238a which is pivotally connected to the end 246a of the left coupling link 246. The end 245b of the sliding member 245 of transverse slide assembly 238 is pivotally connected to end 244b of the right coupling link 244 which, in turn, is pivotally connected to the portion 234c of the rocker 234. Left rocker 242 is pivotally mounted on the left end 226d of axle 226 and is pivotally connected at point 242a to end 240a of the left tie rod 240, which, in turn, is pivotally connected to the left wheel mount arm 232. Preferably, the transverse slide assembly 238 includes: (a) a movable rod or sliding member 245; and (b) a guide member 247, such as a sleeve or other support member which is rigidly connected to the mount 228 and which receives the sliding member 245. The guide member 247 limits the movement of the sliding member 245 to a lateral or side-to-side motion.

In the illustrated embodiment, the right rocker 234 is directly coupled to the push-pull input member 224. It should be appreciated that this embodiment can be adapted so that the pivoting left rocker 242 can be directly coupled to the push-pull rod 224. It should also be appreciated that the front wheel assembly can be configured so that the input device 224 is positioned proximate the left end 226d of the axle 226, proximate the right end 226c of the axle 226 or at any other suitable position relative to the ends 226c and 226d of the axle 226. Depending upon the position of the input device 224 relative to the ends 226c and 226d of axle 226, one or more suitable bars, links, rods or other force transmitters can be used to couple the input device 224 to a select one of the members 234, 240 or 245 in such a manner that the lateral movement of sliding member 245 is proportional to the angle $\hat{1}_s$ through which a tricycle front wheel would have turned to achieve the desired radius of turn, as indicated in FIG. 7.

The axle 226 has a front side 226e and a back side 226f. The back side 226f is closer to the rear axles 40 than the front side 226e. It is preferable that the transverse slide assembly 238 is positioned on the front side 226e of the axle 226. It is also preferable that at least a portion of each of the right rocker 234, the right tie rod 236, the left rocker 242 and the left tie rod 240 be positioned on the front side 226e of the axle 226. Such a spacing arrangement provides additional space for the other components of the tractor 10 which are positioned on or adjacent to the back side 226f of the axle 226. Various pins, bolts, nuts, spacers, ball joints, bushings and other suitable fasteners can be used to make the pivotal and rigid connections in the steering assembly 16. Preferably, the mount 228 is bolted or welded to the axle 226.

In operation, the turn radius determined by the steering assembly 16 is equal to or substantially equal to the turn radius determined by the transmission assembly 12. If the user turns the steering device 26 clockwise, the timed steering belt 200 moves in a counterclockwise direction, and the input member 224 moves forward, causing the front wheels 24a and 24b to pivot in a clockwise direction. The steering assembly 16 therefore determines a turn radius for the tractor 10. At the same time, the steering input from the timed steering belt 200 causes the transmission assembly 12 to cause the rear drive wheels 20a and 20b to rotate at different speeds relative to each other. The transmission assembly 12 therefore determines a turn radius for the tractor 10. The turn radius determined by the steering assembly 16 is equal to or substantially equal to the turn radius determined by the transmission assembly 12. This enables the tractor 10 to respond to the user's steering input in a manner similar to the response experienced by automobile drivers.

The steering assembly 16, in one embodiment of the present invention, includes a steering wheel coupled to an input rod which has fore-aft movement. The input rod is coupled to a right wheel steering control arm and a laterally moving rod. The laterally moving rod is coupled to the left wheel steering control arm. The input rod and the steering controls arms are preferably positioned on the front side of the steering axle. This type of steering assembly provides tractors with increased steering reliability and additional space on the back side of the front axle.

It should be appreciated that the steering assembly of the present invention can be used with and installed on tractor 10 or any other tractor or other vehicle which has a steering device. Furthermore, it should be appreciated that the steering assembly of the present invention and the transmission control device of the present invention need not be included in the same tractor or vehicle.

It should be appreciated that the transmission control device and the steering assembly of the present invention can each be installed and used (separately or together) on any vehicle, tractor, mowing machine, harvesting machine, plant picking machine, utility vehicle, construction machine, autonomous vehicle, snow plow machine, snow thrower, vacuum machine, cleaning machine, power tool or recreational vehicle which includes a steering device for controlling the direction of the vehicle.

Although in one embodiment of the present invention, the user is preferably a human who provide steering input and speed input, it should be appreciated that in other embodiments, a computer or controller can provide that vehicle with steering inputs and/or speed inputs. In this case, it is preferable that such a computer or controller communicates with one or more photo eyes or sensors or a position tracking system to aid the vehicle in automatically driving in the appropriated direction at the appropriate speed.

In one embodiment, the present invention includes a transmission control device and a steering assembly for a spin steer or zero radius turn tractor. The transmission control device coordinates the user's steering inputs with the user's foot pedal inputs in order to produce a ratio of right rear wheel speed to left rear wheel speed. This ratio determines a turn angle for the tractor. In one embodiment, the steering assembly includes a steering wheel coupled to a push rod which, in turn, is coupled to a pair of right and left steer control arms. As the user rotates the steering wheel, the steer control arms cause the front wheels to pivot clockwise or counterclockwise, producing a turn angle for the tractor. The turn angle of the transmission is equal to or substantially equal to the turn angle of the steering system. The present invention provides users of tractors and other vehicles with increased driving control, maneuverability and convenience.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

What is claimed is:

1. An apparatus for providing input to a drive transmission and a steer transmission of a vehicle, the apparatus comprising:

a drive input receiver;

a steer input receiver;

a drive transmission input device;

a steer transmission input device; and a converter operatively coupled to the drive input receiver, the steer input receiver, the drive transmission input device and the steer transmission input device, the converter having: (a) a drive multiplier operatively coupled to the drive input receiver and to the steer input receiver; and (b) a steer multiplier operatively coupled to the steer input receiver.

2. The apparatus of claim 1, wherein the drive input receiver has a pivoting member.

3. The apparatus of claim 1, wherein the steer input receiver has a crank member.

4. The apparatus of claim 1, wherein the drive transmission input device has a pivoting member.

5. The apparatus of claim 1, wherein the steer transmission input device has a pivoting member.

6. The apparatus of claim 1, wherein the vehicle has a zero radius turn capability.

7. The apparatus of claim 1, wherein the vehicle is a tractor.

8. The apparatus of claim 1, wherein the vehicle has a steering assembly operatively coupled to the steer input receiver.

9. The apparatus of claim 8, wherein the steering assembly is adapted to pivot a plurality of front wheels.

10. An apparatus for providing input to a drive transmission and a steer transmission of a vehicle, the apparatus comprising:

a drive input receiver;

a steer input receiver;

a drive transmission input device;

a steer transmission input device; and a converter operatively coupled to the drive input receiver, the steer input receiver, the drive transmission input device and the steer transmission input device, the converter having: (a) a drive multiplier operatively coupled to the drive input receiver and to the steer input receiver; and b) a steer multiplier operatively coupled to the steer input receiver, the steer multiplier having a crank arm operatively coupled to the steer input receiver, a force transmitter operatively coupled to said crank arm and to the steer transmission input device, and a neutral control member operatively coupled to said force transmitter and to at least one coupling member which operatively couples the neutral control member to the drive input receiver.

11. An apparatus for providing input to a drive transmission and a steer transmission of a vehicle, the apparatus comprising:

a drive input receiver;

a steer input receiver;

a drive transmission input device;

a steer transmission input device; and a converter operatively coupled to the drive input receiver, the steer input receiver, the drive transmission input device and the steer transmission input device, the converter having at least one electronic component.

12. An apparatus for providing input to a drive transmission and a steer transmission of a vehicle, the apparatus comprising:

a drive input receiver;

a steer input receiver;

a drive transmission input device;

a steer transmission input device; and a converter operatively coupled to the drive input receiver, the steer input receiver, the drive transmission input device and the steer transmission input device, the converter having at least one processor.

13. An apparatus for providing input to a drive transmission and a steer transmission of a vehicle, the apparatus comprising:

a drive input receiver;

a steer input receiver;

a drive transmission input device;

a steer transmission input device; and a converter operatively coupled to the drive input receiver, the steer input receiver, the drive transmission input device and the steer transmission input device, the converter having: (a) a drive multiplier operatively coupled to the drive input receiver and to the steer input receiver; and (b) a steer multiplier operatively coupled to the steer input receiver, the drive multiplier having a crank arm operatively coupled to the steer input receiver, a force transmitter operatively coupled to the crank arm and to the drive transmission input device, and a neutral control member operatively coupled to the force transmitter and to at least one coupling member which operatively couples the neutral control member to the drive input receiver.

14. A vehicle comprising:

a frame;

a plurality of front wheels rotatably connected to the frame;

a plurality of rear drive wheels rotatably connected to the frame;

an engine operatively coupled to the rear drive wheels;

a speed control device;

a steering control device a drive input receiver operatively coupled to the speed control device;

a steer input receiver operatively coupled to the steering control device;

a drive transmission input device;

a steer transmission input device;

a converter operatively coupled to the drive input receiver, the steer input receiver, the drive transmission input device and the steer transmission input device, the converter having: (a) a drive multiplier operatively coupled to the drive input receiver and to the steer input receiver; and (b) a steer multiplier operatively coupled to the steer input receiver;

a drive transmission operatively coupled to the drive transmission input device and to the rear drive wheels; and a steer transmission operatively coupled to the steer transmission input device and to the rear drive wheels.

15. The vehicle of claim 14, wherein the vehicle is a tractor.

16. The vehicle of claim 14, wherein the vehicle is a vehicle selected from the group consisting of a tractor, a mowing machine, a harvesting machine, a plant picking machine, a snow plow machine, a snow thrower, a vacuum machine, a cleaning machine, a power tool and a recreational vehicle.

17. The vehicle of claim 14, wherein the drive input receiver has a pivoting member.

18. The vehicle of claim 14, wherein the steer input receiver has a crank member.

19. The vehicle of claim 14, wherein the drive transmission input device has a pivoting member.

20. The vehicle of claim 14, wherein the steer transmission input device has a pivoting member.

21. A method for controlling input to a transmission of a vehicle, the transmission controlling speed and direction of the vehicle, said method comprising the steps of:
   (a) providing a steer input receiver which receives steering input from a user steering control device;
   (b) providing a drive input receiver which receives drive input from a user speed control device;
   (c) operatively coupling a steer multiplier to the steer input receiver so as to convert the steering input to a converted steering input;
   (d) operatively coupling a drive multiplier to the drive input receiver so as to convert the drive input to a converted drive input;
   (e) transmitting the converted steering input to the transmission; and
   (f) transmitting the converted drive input to the transmission.

22. The method of claim 21, wherein the steering input and the drive input are received simultaneously.

23. The method of claim 21, wherein the steering input and the drive input are converted simultaneously.

24. The method of claim 21, wherein step (a) includes the step of receiving input from a steering wheel of a tractor.

25. The method of claim 21, wherein step (b) includes the step of receiving input from a speed control device of a tractor.

26. A vehicle comprising:
   a frame;
   a plurality of front wheels rotatable connected to the frame;
   a plurality of rear drive wheels rotatable connected to the frame;
   an engine operatively coupled to the rear drive wheels;
   a speed control device;
   a steering control device
   a drive input receiver operatively coupled to the speed control device;
   a steer input receiver operatively coupled to the steering control device;
   a drive transmission input device;
   a steer transmission input device; and
   a converter operatively coupled to the drive input receiver, the steer input receiver, the drive transmission input device and the steer transmission input device;
   a drive transmission operatively coupled to the drive transmission input device and to the rear drive wheels;
   a steer transmission operatively coupled to the steer transmission input device and to the rear drive wheels; and
   a steering assembly operatively coupled to the steering control device and to the front wheels, the steering assembly including an axle having a first axle end and a second axle end, a first wheel mount arm operatively coupled to the first axle end, a second wheel mount arm operatively coupled to the second axle end and an input member operatively coupled to the first wheel mount arm and the second wheel mount arm, the input member having a fore-aft path of movement.

27. A steering assembly for a vehicle, the steering assembly comprising:
   an axle having a first axle end and a second axle end, the axle having a front side furthest from a rear end of the vehicle, and the axle having a back side closest to the rear end of the vehicle;
   a first wheel mount arm operatively coupled to the first axle end;
   a second wheel mount arm operatively coupled to the second axle end;
   an input member operatively coupled to the first wheel mount arm and the second wheel mount arm, the input member having a fore-aft path of movement;
   a slide member operatively coupling the input member to the first wheel mount arm or the second wheel mount arm;
   a mount member rigidly connectable to a frame of the vehicle; and
   a guide member connected to the mount member, the guide member positioned adjacent to the slide member, the guide member being pivotally connected to the slide member.

28. The steering assembly of claim 27 wherein the input member has an elongated shape.

29. The steering assembly of claim 27, wherein the slide member has an elongated shape.

30. The steering assembly of claim 27, wherein the slide member has a side-to-side path of movement.

31. The steering assembly of claim 27, wherein the slide member is positioned closer to the front side of the axle than the back side of the axle.

32. The steering assembly of claim 27, wherein the axle has a pivoting member.

33. A steering assembly for a vehicle, the vehicle having a transmission which controls speed and direction of the vehicle, the steering assembly comprising:
   a user steering device;
   a crank operatively coupled to the user steering device, the crank having a round portion;
   a flexible force transmitter coupled to the crank and adapted to be operatively coupled to the transmission; and
   a coupling member operatively coupled to the crank, the coupling member having a fore-aft path of movement and the coupling member adapted to be operatively coupled to at least one front wheel.

34. The steering assembly of claim 33 wherein the user steering device is rotatable.

35. The steering assembly of claim 33, wherein the user steering device has a steering wheel.

36. The steering assembly of claim 33, wherein the coupling member is rigid.

37. The steering assembly of claim 33, wherein the flexible force transmitter has a belt.

38. A vehicle comprising:
   a frame having a front axle and a rear axle;
   a transmission supported by the frame, the transmission operable to control speed and direction of the vehicle;
   a plurality of front wheels rotatably connected to the front axle, the front axle having a first axle end and a second axle end;
   a plurality of rear wheels rotatably connected to the rear axle;
   a first wheel mount arm operatively coupled to the first axle end;
   a second wheel mount arm operatively coupled to the second axle end;

a user steering device;

a crank operatively coupled to the user steering device, the crank having a round portion;

a flexible force transmitter coupled to the crank and the transmission; and a coupling member operatively coupled to the crank, the first wheel mount arm and the second wheel mount arm, the coupling member having a fore-aft path of movement.

39. The vehicle of claim 38, wherein the coupling member has an elongated shape.

40. The vehicle of claim 38, which includes a slide member which operatively couples the coupling member to the first wheel mount arm and the second wheel mount arm.

41. The vehicle of claim 40, wherein the slide member has an elongated shape.

42. The vehicle of claim 40, wherein the slide member has a side-to-side path of movement.

43. The vehicle of claim 40, wherein the front axle has a front side furthest from a rear end of the vehicle, and the front axle has a back side closest to the rear end of the vehicle, the slide member being positioned closer to the front side of the front axle than the back side of the front axle.

44. The vehicle of claim 38, wherein the flexible force transmitter includes at least one belt.

* * * * *